US012658614B2

(12) United States Patent
Han et al.

(10) Patent No.: US 12,658,614 B2
(45) Date of Patent: Jun. 16, 2026

(54) ELECTRONIC DEVICE INCLUDING CONNECTING INTERFACE FOR CONNECTING CAMERA MODULE TO PRINTED CIRCUIT BOARD

(71) Applicant: SAMSUNG ELECTRONICS CO., LTD., Suwon-si (KR)

(72) Inventors: Jinho Han, Suwon-si (KR); Jongsoo Kim, Suwon-si (KR); Jiwoo Lee, Suwon-si (KR); Jinhwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 641 days.

(21) Appl. No.: 18/095,518

(22) Filed: Jan. 10, 2023

(65) Prior Publication Data

US 2023/0208057 A1 Jun. 29, 2023

Related U.S. Application Data

(63) Continuation of application No. PCT/KR2022/015716, filed on Oct. 17, 2022.

(30) Foreign Application Priority Data

Dec. 28, 2021 (KR) ........................ 10-2021-0189360
Feb. 3, 2022 (KR) ........................ 10-2022-0014090

(51) Int. Cl.
*H01R 12/70* (2011.01)
*H01R 13/05* (2006.01)
*H01R 13/631* (2006.01)

(52) U.S. Cl.
CPC ....... *H01R 12/7076* (2013.01); *H01R 13/057* (2013.01); *H01R 13/631* (2013.01); *H01R 2201/16* (2013.01)

(58) Field of Classification Search
CPC ........................... H01R 12/70; H01R 12/7076; H01R 12/7082; H01R 13/04; H01R 13/22; H01R 13/24; H01R 13/631
(Continued)

(56) References Cited

U.S. PATENT DOCUMENTS 7,442,048 B2 10/2008 Shih
2021/0297515 A1 9/2021 Yu
(Continued)

FOREIGN PATENT DOCUMENTS

CN 108289162 A 7/2018
CN 108600440 B 9/2020
(Continued)

OTHER PUBLICATIONS

ENG text of Atsushi, et al. (JP-2004328474-A) (Year: 2004).*
(Continued)

*Primary Examiner* — Abdullah A Riyami
*Assistant Examiner* — Amara Anderson
(74) *Attorney, Agent, or Firm* — CANTOR COLBURN LLP

(57) ABSTRACT

An electronic device includes a first printed circuit board (PCB) including an opening, and a plurality of first connecting terminals disposed to be spaced apart from each other along a circumference of the opening, a camera module including a second PCB, and a connecting interface including an interface body connected to a lower end of the camera module. A plurality of second connecting terminals formed of an elastic material and are disposed to be spaced apart from each other along a circumference of the interface body to be electrically connected to the second PCB. The connecting interface is inserted into the opening so that the first connecting terminals are electrically connected to one respective second connecting terminal of the plurality of (Continued)

second connecting terminals, and a relative position of the connecting interface with respect to the opening is fixed by an elastic force of the plurality of second connecting terminals.

19 Claims, 17 Drawing Sheets

(58) Field of Classification Search
USPC ............................................................ 439/65
See application file for complete search history.

(56) References Cited

U.S. PATENT DOCUMENTS

| | | | | |
|---|---|---|---|---|
| 2022/0094823 | A1* | 3/2022 | Song | H04N 23/57 |
| 2022/0286591 | A1* | 9/2022 | Seo | H04N 23/54 |

FOREIGN PATENT DOCUMENTS

| | | | | | |
|---|---|---|---|---|---|
| JP | H11191865 | A | | 7/1999 | |
| JP | 2004328474 | A | * | 11/2004 | |
| JP | 2005268963 | A | | 9/2005 | |
| JP | 3807435 | B2 | | 8/2006 | |
| JP | 2007129092 | A | | 5/2007 | |
| JP | 2008288518 | A | | 11/2008 | |
| KR | 20080000275 | A | * | 1/2008 | H05K 1/189 |
| KR | 20100098879 | A | | 9/2010 | |
| KR | 20120005301 | A | * | 1/2012 | H04M 1/0274 |
| KR | 101175869 | B1 | | 8/2012 | |
| KR | 20150081578 | A | | 7/2015 | |
| KR | 101696717 | B1 | | 1/2017 | |
| KR | 20200089999 | A | * | 7/2020 | H04N 23/57 |
| KR | 20210012675 | A | | 2/2021 | |
| WO | WO-2021040341 | A1 | * | 3/2021 | H04N 23/55 |

OTHER PUBLICATIONS

Extended European Search Report corresponding to Application No. 22916332.4-1218; Dated Oct. 15, 2024.

International Search Report; International Application No. PCT/KR2022/015716; International Filing Date: Oct. 17, 2022; Date of mailing: Jan. 19, 2023; 3 pages.

* cited by examiner

ELECTRONIC DEVICE INCLUDING CONNECTING INTERFACE FOR CONNECTING CAMERA MODULE TO PRINTED CIRCUIT BOARD

CROSS-REFERENCE TO RELATED APPLICATIONS

This application is a continuation application of International Application No. PCT/KR2022/015716 designating the United States, filed on Oct. 17, 2022, in the Korean Intellectual Property Receiving Office and claiming priority to Korean Patent Application No. 10-2022-0014090, filed on Feb. 3, 2022 and Korean Patent Application No. 10-2021-0189360, filed on Dec. 28, 2021, in the Korean Intellectual Property Office, the disclosures of which are incorporated by reference herein in their entireties.

BACKGROUND

1. Field

One embodiment of the present disclosure relates to an electronic device including a connecting interface for connecting a camera module to a printed circuit board (PCB).

2. Description of Related Art

An electronic device including a camera may provide a photographing function. For example, the electronic device may output an image obtained from the camera to a display and may obtain a captured image from the camera as a shutter operates.

In general, in order to dispose a camera module on a main printed circuit board (PCB) of an electronic device, a separate connector socket capable of fixing a position of a camera module is used. In addition, in order to electrically connect the camera module to the main PCB of the electronic device, a separate connecting flexible printed circuit board (FPCB) is used. Moreover, according to such a structure, a separate space for disposing the connecting FPCB is required, which may limit a design of the inner space of the electronic device.

SUMMARY

According to one embodiment, an electronic device including an integrated connecting interface may be provided to efficiently utilize the inner space of the electronic device.

According to one embodiment, an electronic device capable of electrically connecting a camera module to a PCB of the electronic device via a connecting interface while fixing the camera module to the PCB at the same time may be provided.

According to one embodiment, an electronic device capable of connecting a camera module to a PCB of the electronic device in a vertical direction via a connecting interface may be provided.

According to one embodiment, an electronic device 301 includes a first PCB 340 including an opening 341, and a plurality of first connecting terminals 342 disposed to be spaced apart from each other along a circumference of the opening 341, a camera module 350 including a second PCB 353, and a connecting interface 400 including an interface body 410 connected to a lower end of the camera module 350, and a plurality of second connecting terminals 420 formed of an elastic material and disposed to be spaced apart from each other along a circumference of the interface body 410 to be electrically connected to the second PCB 353, wherein the connecting interface 400 is inserted into the opening 341 so that each first connecting terminal of the plurality of first connecting terminals 342 are electrically connected to one respective second connecting terminal of the plurality of second connecting terminals 420, and a relative position of the connecting interface 400 with respect to the opening 341 is fixed by an elastic force of the plurality of second connecting terminals 420.

According to an embodiment, an electronic device includes a first PCB 540 including an opening 541, a plurality of first connecting terminals 542 disposed to be spaced apart from each other along a circumference of the opening 541, one or more insertion grooves 543 (also referred to as a projection insertion groove), a first camera module **550*a* including a second PCB 553*a*, a second camera module 550*b* including a third PCB 553*b*, and a connecting interface 600 including an interface body 610 connected to a lower end of the first camera module 550*a* and a lower end of the second camera module 550*b*. A plurality of second connecting terminals 620 formed of an elastic material and disposed to be spaced apart from each other along a circumference of the interface body 610 are electrically connected to the second PCB 553*a* or the third PCB 553*b*, wherein the connecting interface 600 is inserted into the opening 541 so that each first connecting terminal of the plurality of first connecting terminals 542 is electrically connected to one respective second connecting terminal of the plurality of second connecting terminals 620, and a relative position of the connecting interface 600 with respect to the opening 541 is fixed by an elastic force of the plurality of second connecting terminals 620**.

According to an embodiment, an electronic device 301 includes a first PCB 340 including an opening 341, and a plurality of first connecting terminals 342 disposed to be spaced apart from each other along a circumference of the opening 341, a camera module 350 including a second PCB 353, and a connecting interface 400 including an interface body 410 connected to a lower end of the camera module 350. A plurality of second connecting terminals 420 formed of an elastic material and disposed to be spaced apart from each other along a circumference of the interface body 410 are electrically connected to the second PCB 353, wherein the connecting interface 400 is inserted into the opening 341 so that each first connecting terminal of the plurality of first connecting terminals 342 is electrically connected to one respective second connecting terminal of the plurality of second connecting terminals 420, a relative position of the connecting interface 400 with respect to the opening 341 is fixed by an elastic force of the plurality of second connecting terminals 420. The second connecting terminal 420 includes a first portion 421 disposed on an upper side of the interface body 410 in a horizontal direction, a second portion 422 bent and extending from one end portion of the first portion 421 to be disposed in a lateral direction of the interface body 410, and a hook portion 423 formed at one end portion of the second portion 422. A bending angle A1 between the first portion 421 and the second portion 422 in an initial state is 90 degrees or more, the bending angle A1 between the first portion 421 and the second portion 422 is elastically changeable by the elastic force of the plurality of second connecting terminals 420. The interface body 410 includes a main body 411 formed in a size corresponding to the opening 341, a flange 412 extending in an outward direction from a circumference of an upper portion of the main body 411, and at least one insertion projection 413 formed to protrude in a downward direction from the flange 412.

According to one embodiment, the camera module may be electrically connected to the PCB of the electronic device via the connecting interface while fixing the camera module to the PCB at the same time.

According to one embodiment, by connecting the camera module to the PCB of the electronic device in a vertical direction via the connecting interface, the efficiency of using the inner space of the electronic device may be improved.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
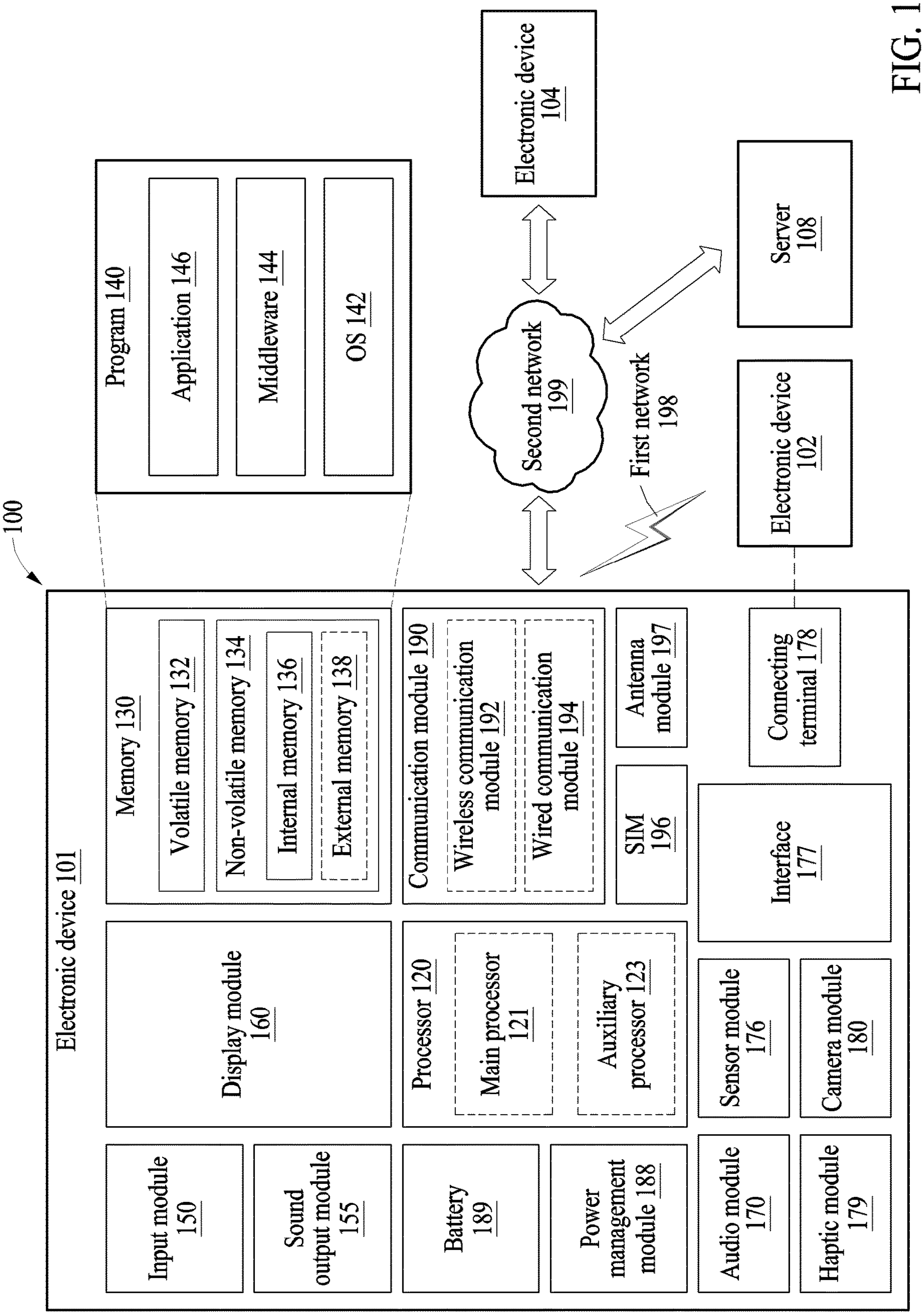
FIG. 1 is a block diagram illustrating an electronic device in a network environment according to one embodiment.

Hereinafter, one embodiment will be described in detail with reference to the accompanying drawings. When describing one embodiment with reference to the accompanying drawings, like reference numerals refer to like elements and a repeated description related thereto will be omitted.

FIG. 1 is a block diagram illustrating an electronic device in a network environment according to one embodiment; Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In one embodiment, at least one (e.g., the connecting terminal 178) of the above components may be omitted from the electronic device 101, or one or more other components may be added to the electronic device 101. In one embodiment, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjoint with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor

123. According to one embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electric signal or vice versa. According to one embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
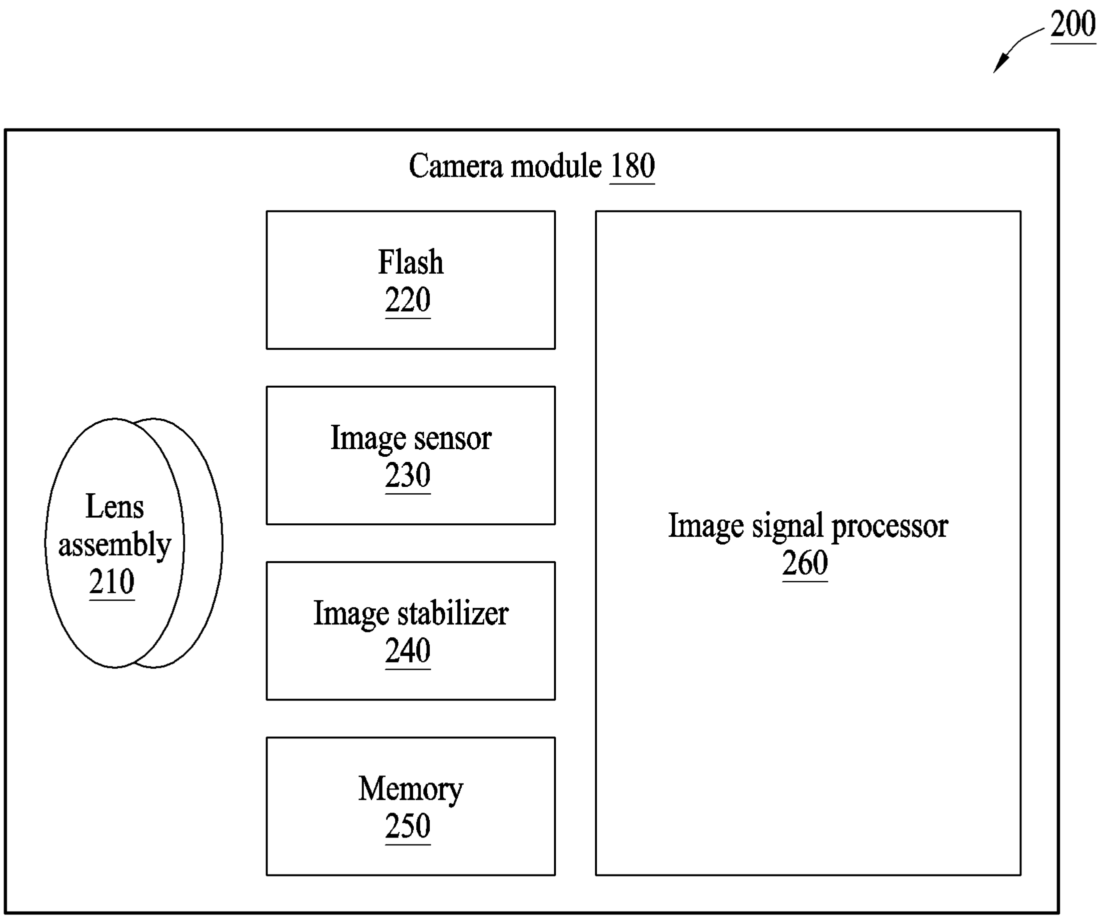
FIG. 2 is a block diagram illustrating a camera module according to one embodiment.

FIG. 2 is a block diagram illustrating a camera module according to one embodiment; Referring to FIG. 2, the camera module 180 may include a lens assembly 210, a flash 220, an image sensor 230, an image stabilizer 240, a memory 250 (e.g., a buffer memory), or an image signal processor (ISP) 260. The lens assembly 210 may collect light emitted from an object, which is a target of which an image is to be captured. The lens assembly 210 may include one or more lenses. According to one embodiment, the camera module 180 may include a plurality of lens assemblies 210. In this case, the camera module 180 may constitute, for example, a dual camera, a 360-degree camera, or a spherical camera. Some of the lens assemblies 210 may have the same lens properties (e.g., an angle of view, a focal length, an auto focus, an f number, or an optical zoom), or at least one of the lens assemblies 210 may have one or more lens properties that are different from those of other lens assemblies. The lens assembly 210 may include, for example, a wide-angle lens or a telephoto lens.

The flash 220 may emit light to be used to reinforce light emitted or reflected from the object. According to one embodiment, the flash 220 may include one or more light emitting diodes (LEDs) (e.g., a red-green-blue (RGB) LED, a white LED, an infrared (IR) LED, or an ultraviolet (UV) LED), or a xenon lamp. The image sensor 230 may obtain an image corresponding to the object by converting light emitted or reflected from the object and transmitted through the lens assembly 210 into an electrical signal. According to one embodiment, the image sensor 230 may include, for example, one image sensor selected from among image sensors having different properties, such as, for example, an RGB sensor, a black and white (BW) sensor, an IR sensor, or a UV sensor, a plurality of image sensors having the same properties, or a plurality of image sensors having different properties. Each image sensor included in the image sensor 230 may be implemented using, for example, a charged-coupled device (CCD) sensor or a complementary metal-oxide-semiconductor (CMOS) sensor.

The image stabilizer 240 may move at least one lens included in the lens assembly 210 or the image sensor 230 in a specific direction, or control an operation characteristic of the image sensor 230, in response to a movement of the camera module 180 or the electronic device 101 including the camera module 180. For example, the image stabilizer 240 may adjust a read-out timing. This may compensate for at least a portion of a negative effect of the movement on an image to be captured. According to one embodiment, the image stabilizer 240 may sense such a movement of the camera module 180 or the electronic device 101 using a gyro sensor (not shown) or an acceleration sensor (not shown) disposed inside or outside the camera module 180. According to one embodiment, the image stabilizer 240 may be implemented as, for example, an optical image stabilizer. The memory 250 may temporarily store at least a portion of the image obtained through the image sensor 230 for a subsequent image processing operation. For example, when image acquisition is delayed by a shutter or a plurality of images is obtained at a high speed, an obtained original image (e.g., a Bayer-patterned image or a high-resolution image) may be stored in the memory 250 and a copy image (e.g., a low-resolution image) corresponding the original image may be previewed on the display module 160. Subsequently, when a specified condition (e.g., a user input or a system command) is satisfied, at least a portion of the original image stored in the memory 250 may be obtained and processed by, for example, the ISP 260. According to one embodiment, the memory 250 may be configured as at least a part of the memory 130 or as a separate memory operating independently from the memory 130.

The ISP 260 may perform one or more image processing operations on an image obtained through the image sensor 230 or an image stored in the memory 250. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the ISP 260 may control at least one of the components (e.g., the image sensor 230) included in the camera module 180. For example, the ISP 260 may control an exposure time, a read-out timing, and the like. The image processed by the ISP 260 may be stored again in the memory 250 for further processing, or be provided to an external component (e.g., the memory 130, the display module 160, the electronic device 102, the electronic device 104, or the server 108) of the camera module 180. According to one embodiment, the ISP 260 may be configured as at least a part of the processor 120 or as a separate processor operating independently from the processor 120. When the ISP 260 is configured as a processor separate from the processor 120, at least one image processed by the ISP 260 may be displayed as it is without a change or be displayed on the display module 160 after additional image processing is performed by the processor 120.

According to one embodiment, the electronic device 101 may include a plurality of camera modules 180 having different properties or functions. In this case, for example, at least one of the camera modules 180 may be a wide-angle camera and at least another one of the camera modules 180 may be a telephoto camera. Similarly, at least one of the camera modules 180 may be a front camera and at least another one of the camera modules 180 may be a rear camera.

The electronic device according to one embodiment may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that one embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with one embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

One embodiment of the present disclosure as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to one embodiment, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to one embodiment, operations performed by the module, the program, or another component may be carried out sequentially, in parallel, repeatedly, or heuristically, or one or more of the operations may be executed in a different order or omitted, or one or more other operations may be added.

Figure 3A:
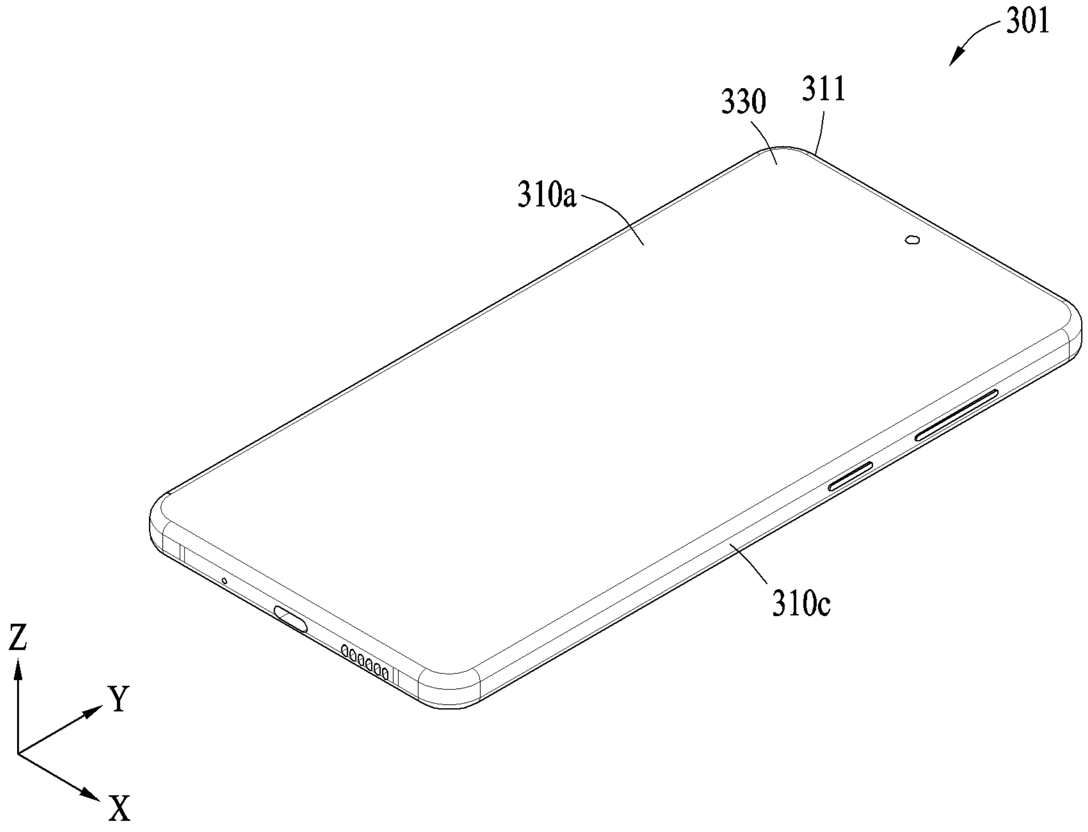
FIG. 3A is a front perspective view of an electronic device according to one embodiment.
Figure 3B:
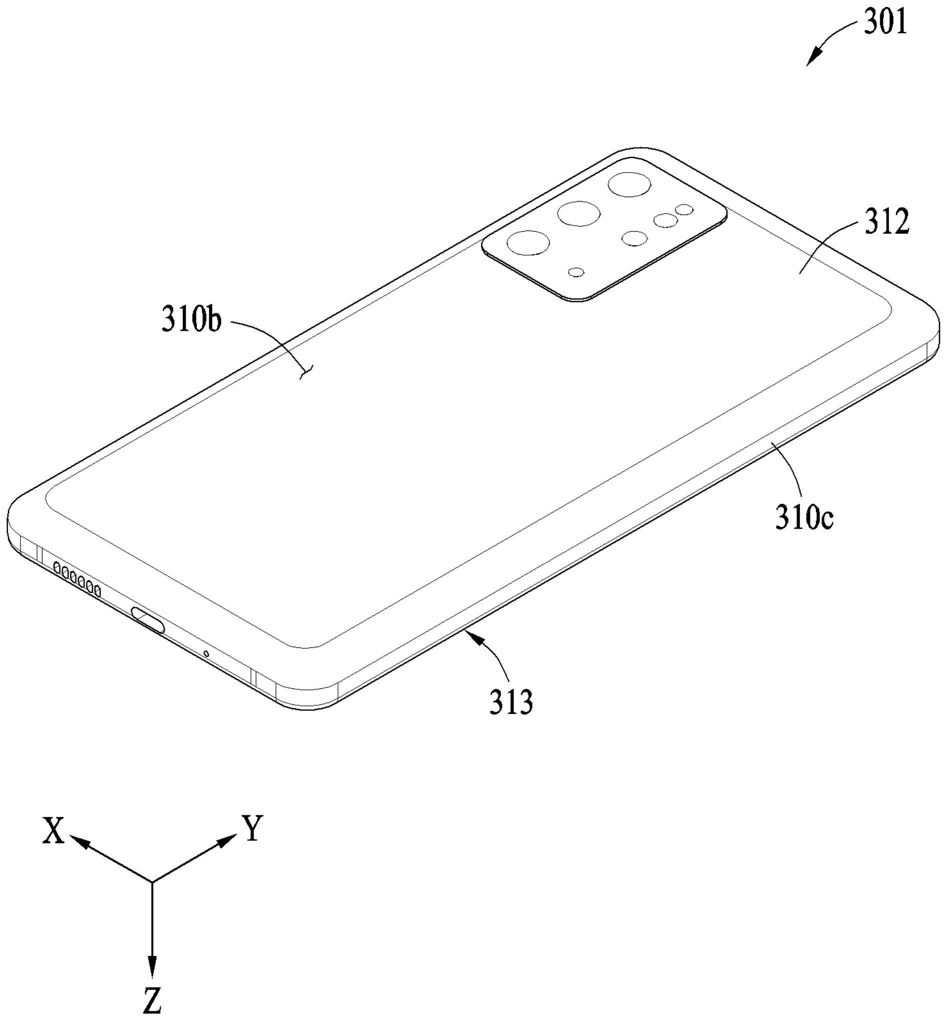
FIG. 3B is a rear perspective view of an electronic device according to one embodiment.
Figure 3C:
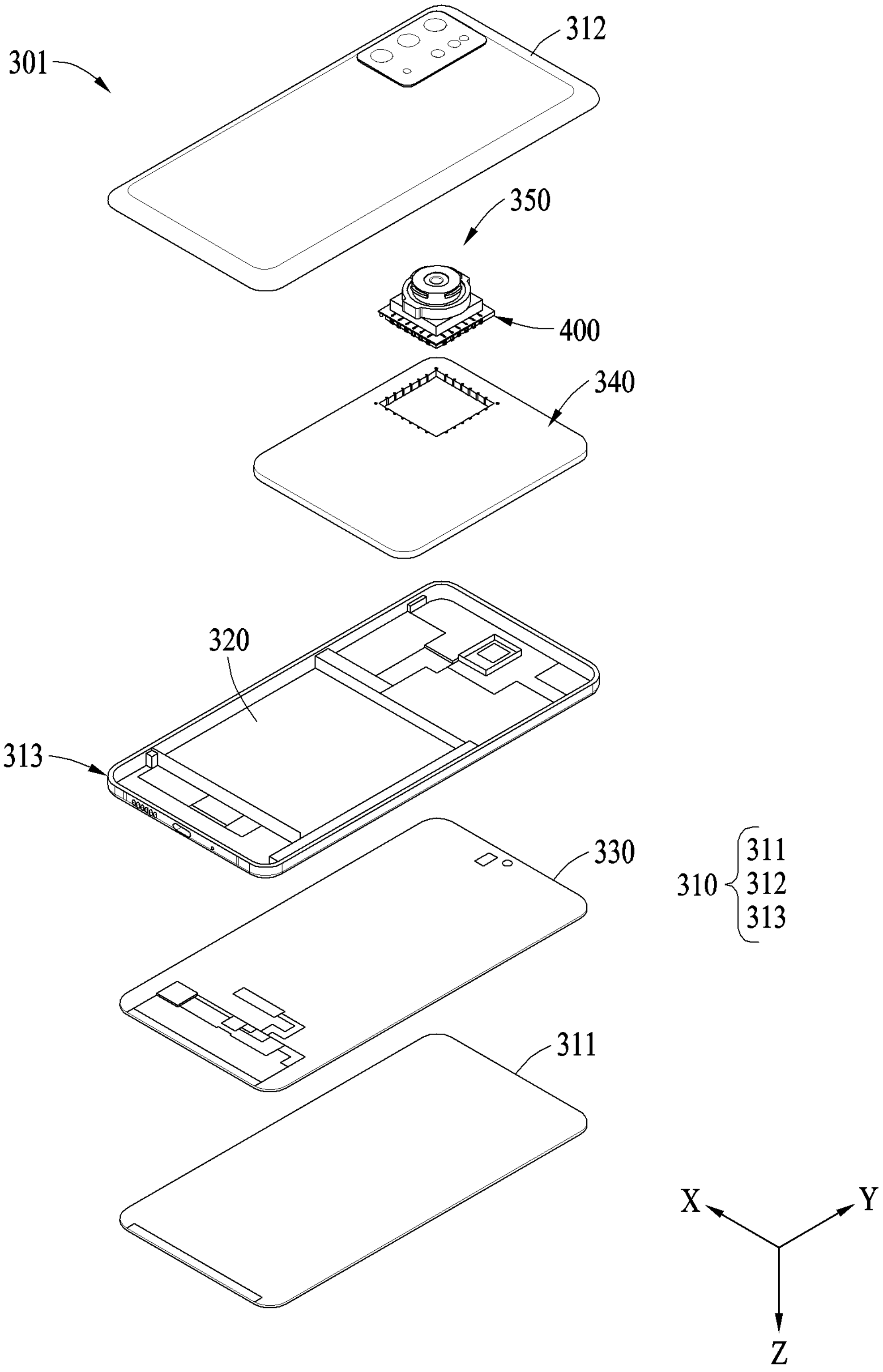
FIG. 3C is an exploded perspective view illustrating an electronic device according to one embodiment.

FIG. 3A is a front perspective view of an electronic device according to one embodiment, FIG. 3B is a rear perspective view of the electronic device according to one embodiment, and FIG. 3C is an exploded perspective view of the electronic device according to one embodiment.

Referring to FIGS. 3A, 3B, and 3C, an electronic device 301 (e.g., the electronic device 101 of FIG. 1) according to one embodiment may include a housing 310, a support member 320, a display 330, a first PCB 340, a camera module 350, and a connecting interface 400.

In one embodiment, the housing 310 may form the exterior of the electronic device 301. The housing 310 may form a front surface 310*a* (e.g., a first surface), a rear surface 310*b* (e.g., a second surface), and a side surface 310*c* (e.g., a third surface) surrounding an inner space between the front surface 310*a* and the rear surface 310*b*. For example, the housing 310 may include a first plate 311 (e.g., a front plate), a second plate 312 (e.g., a rear plate), and a side member 313 (e.g., a side bezel structure).

In one embodiment, the front surface 310*a* may be formed by the first plate 311 of which at least a portion is substantially transparent. For example, the first plate 311 may include a polymer plate or a glass plate including at least one coating layer. In one embodiment, the rear surface 310*b* may be formed of a second plate 312 that is substantially opaque. For example, the second plate 312 may be formed of coated or tinted glass, ceramic, polymer, metal (e.g., aluminum, stainless steel, or magnesium), or a combination thereof. The side surface 310*c* may be coupled to the first plate 311 and the second plate 312 and may be formed by the side member 313 including metal and/or polymer. In one embodiment, the second plate 312 and the side member 313 may be integrally and seamlessly formed. In one embodiment, the second plate 312 and the side member 313 may be formed of substantially the same material (e.g., aluminum).

In one embodiment, the side member 313 may surround at least a portion of the inner space between the front surface 310*a* and the rear surface 310*b*. The support member 320 may be disposed in the inner space of the housing 310. For example, the support member 320 may be connected to the side member 313 or may be formed integrally with the side member 313. The support member 320 may form an arrangement space of components of the electronic device 301. For example, the support member 320 may connect edges of the first plate 311 and the second plate 312 to each other and surround a space between the first plate 311 and the second plate 312. For example, the display 330 may be coupled to one surface (e.g., a surface in a +z direction) of the support member 320. However, this is merely an example, and the position and/or the number of the support member 320 is not limited thereto.

In one embodiment, the electronic device 301 may include the display 330 (e.g., the display module 160 of FIG. 1). In one embodiment, the display 330 may be disposed on the front surface 310*a*. In one embodiment, the display 330 may be exposed through at least a portion of the first plate 311. In one embodiment, the display 330 may have a shape that is substantially the same as a shape of an outer edge of the first plate 311. In one embodiment, an edge of the display 330 may substantially coincide with the outer edge of the first plate 311.

In one embodiment, the first PCB 340 may be disposed in an inner space formed by the housing 310. The first PCB 340 may be supported by the support member 320 in the housing 310. For example, the first PCB 340 may be positioned and supported in a rear direction (e.g., a −z direction) of the support member 320. However, this is merely an example, and the position and/or the number of the first PCB 340 is not limited thereto. For example, in one embodiment, the first PCB 340 may be positioned and supported in the front direction (e.g., the +z direction) of the support member 320. The first PCB 340 may function as a main PCB of the electronic device 301. For example, various circuits for driving the electronic device 301 may be formed or electronic components may be disposed on the first PCB 340.

In one embodiment, the electronic device 301 may include the camera module 350 (e.g., the camera module 180 of FIG. 1). The camera module 350 may be fixedly and electrically connected to the first PCB 340 via the connecting interface 400, as described below. In one embodiment, the camera module 350 may be disposed to be visually exposed through the rear surface 310*b* of the housing 310. Although one camera module 350 is illustrated in FIG. 3C, this is merely an example for convenience of description and illustration, and the position and/or the number of the camera modules 350 is not limited thereto. For example, in one embodiment, the camera module 350 may be disposed to be visually exposed through the front surface 310*a* of the housing 310. For example, in one embodiment, a plurality of camera modules 350 may be provided.

Figure 3D:
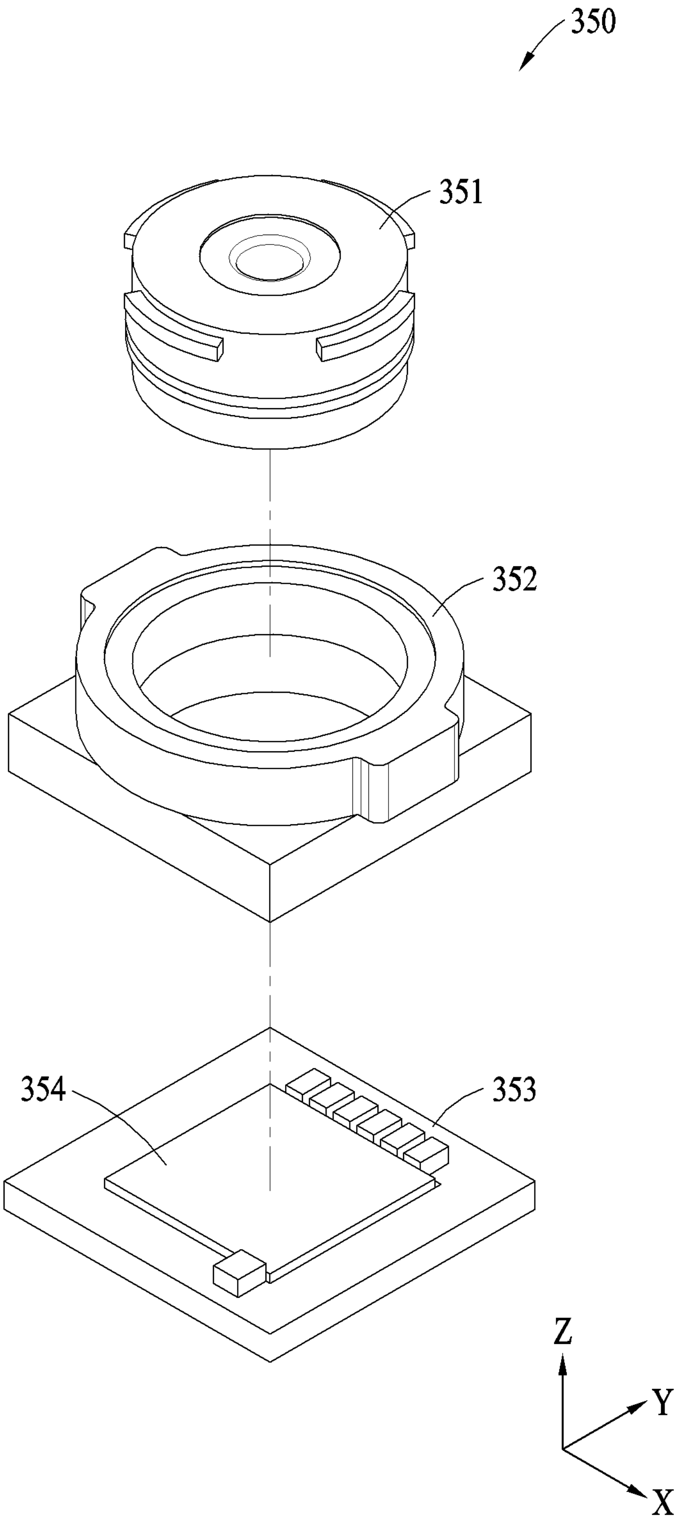
FIG. 3D is an exploded perspective view illustrating a camera module according to one embodiment.
Figure 3E:
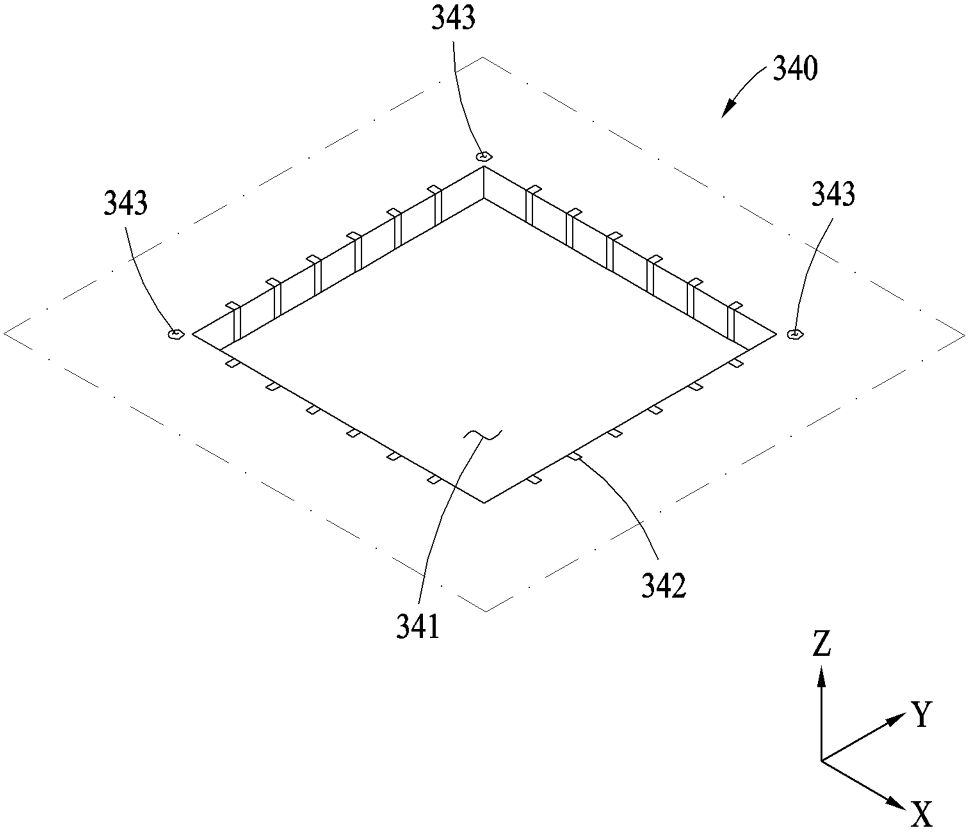
FIG. 3E is an enlarged perspective view of an opening of a first printed circuit board (PCB) according to one embodiment.
Figure 3F:
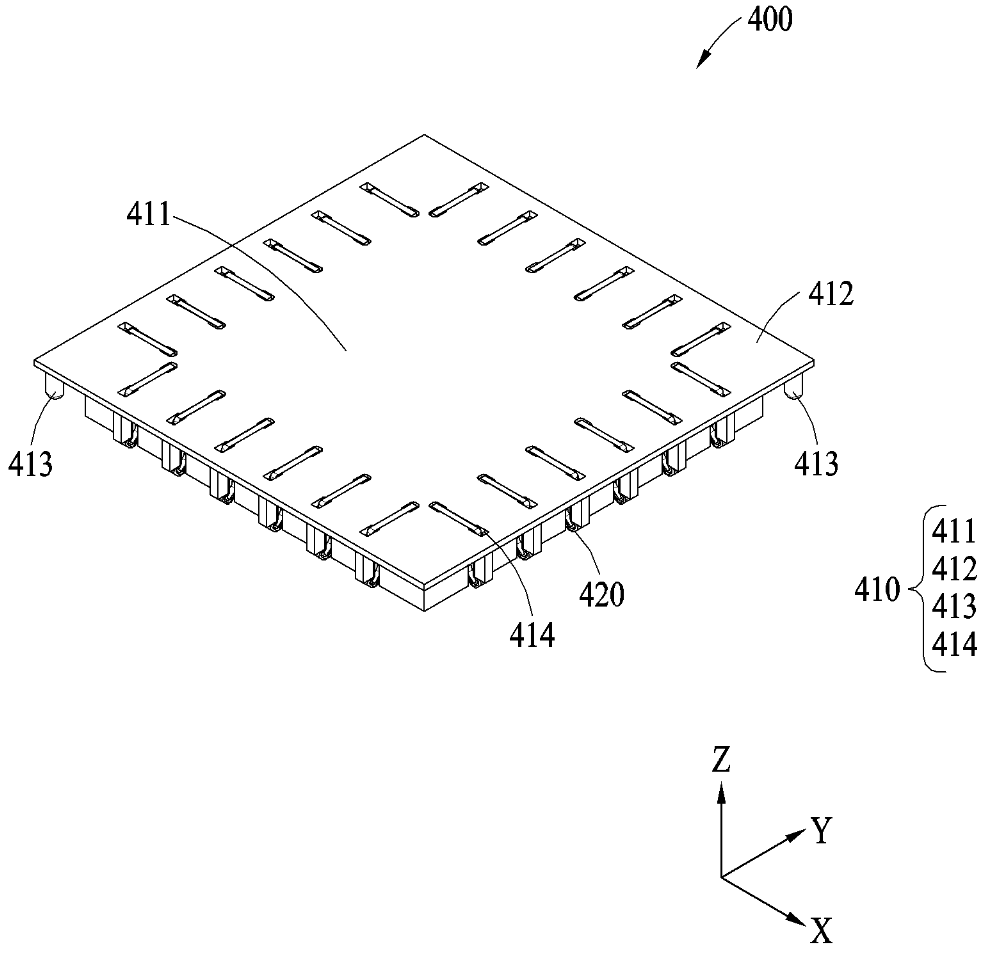
FIG. 3F is a perspective view of a connecting interface according to one embodiment.
Figure 3G:
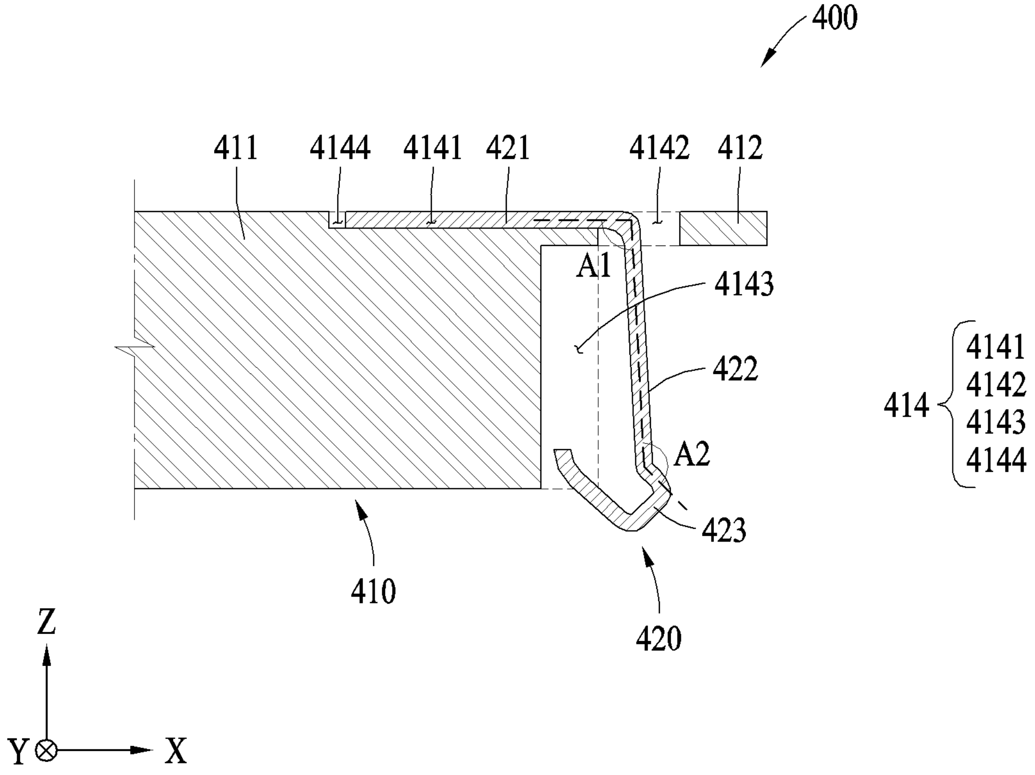
FIG. 3G is a partial cross-sectional view of a connecting interface according to one embodiment.
Figure 3H:
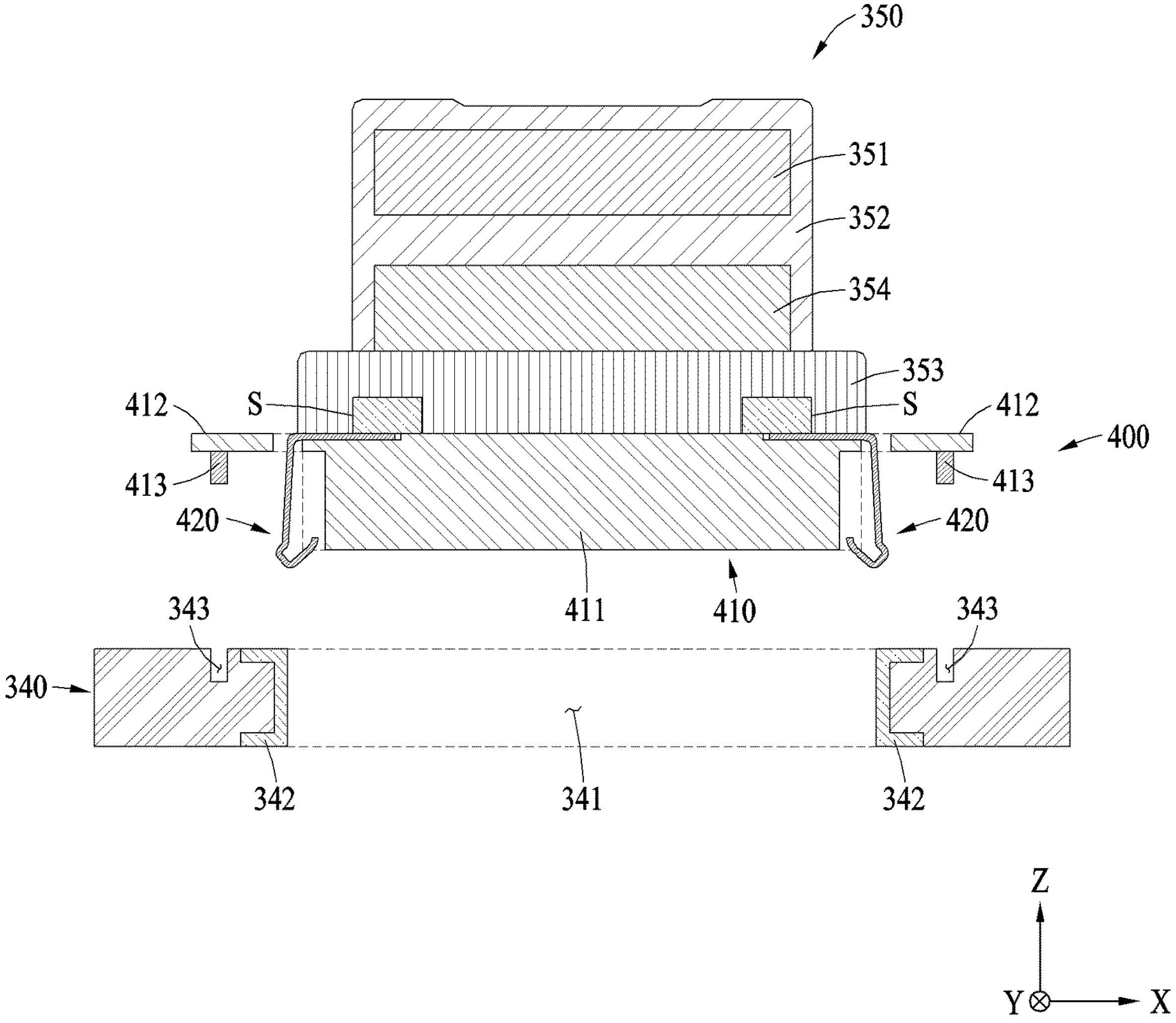
FIG. 3H is a schematic cross-sectional view illustrating a state before a camera module and a connecting interface are coupled to a first PCB according to one embodiment.
Figure 3I:
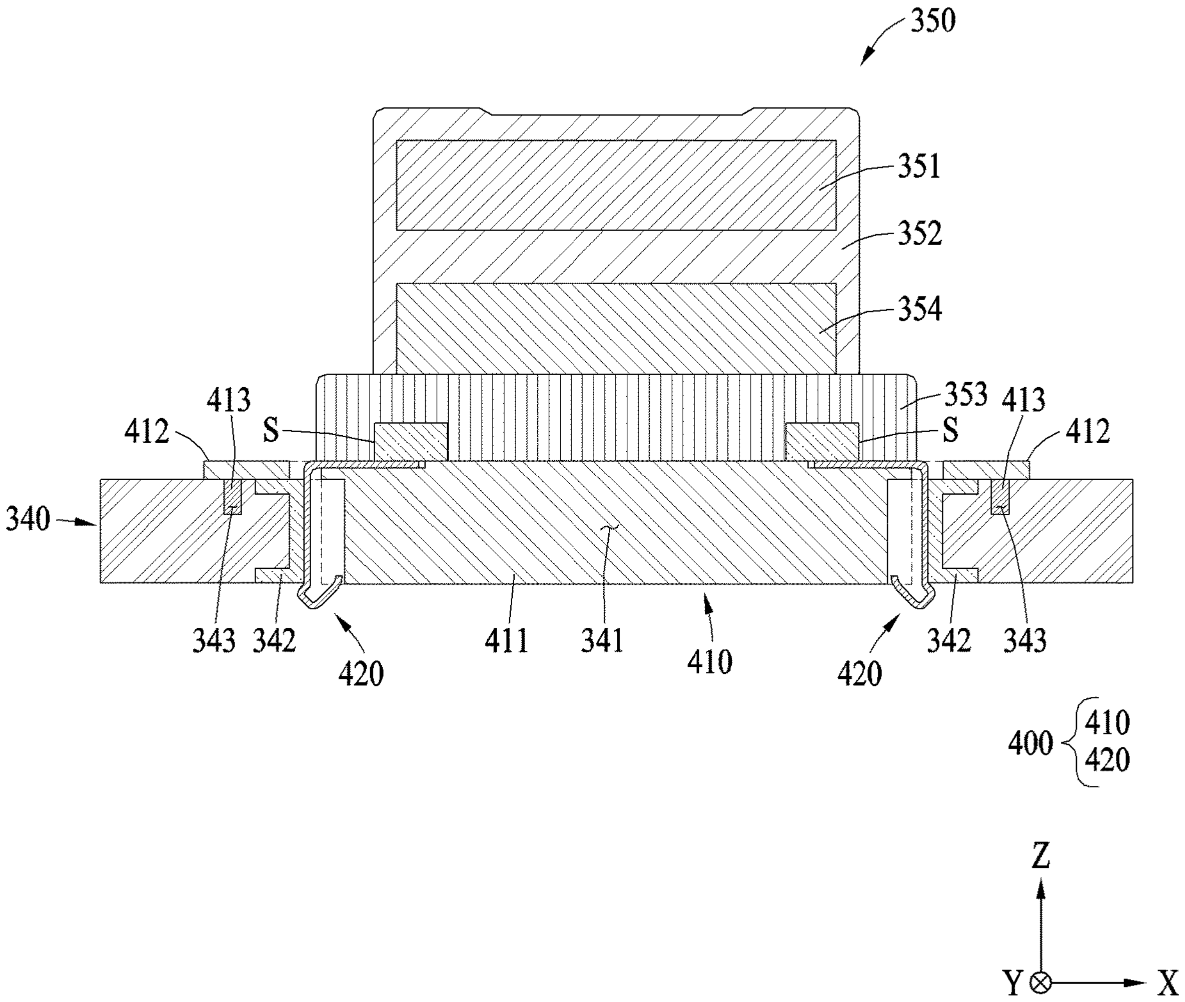
FIG. 3I is a schematic cross-sectional view illustrating a state after a camera module and a connecting interface are coupled to a first PCB according to one embodiment.

FIG. 3D is an exploded perspective view illustrating a camera module according to one embodiment; FIG. 3E is an enlarged perspective view of an opening of a PCB according to one embodiment; FIG. 3F is a perspective view of a connecting interface according to one embodiment; FIG. 3G is a partial cross-sectional view of the connecting interface according to one embodiment; FIG. 3H is a schematic cross-sectional view illustrating a state before the camera module and the connecting interface are coupled to a first PCB according to one embodiment; FIG. 3I is a schematic cross-sectional view illustrating a state after the camera module and the connecting interface are coupled to a first PCB according to one embodiment;

Referring to FIGS. 3D to 3I, in one embodiment, the camera module 350 (e.g., the camera module 180 of FIG. 1) includes a lens assembly 351, a camera housing 352, a second PCB 353, and an image processor 354. However, this is merely an example, and a configuration of the camera module 350 is not limited thereto. For example, the camera module 350 may further include a filter (not shown), a flash (e.g., the flash 220 of FIG. 2) and/or an image stabilizer (e.g., the image stabilizer 240 of FIG. 2).

In one embodiment, the lens assembly 351 (e.g., the lens assembly 210 of FIG. 2) may collect light reflected or emitted from an object, which is a target of which an image is to be captured. The lens assembly 351 may include one or a plurality of lenses.

In one embodiment, the camera housing 352 may form at least a portion of the exterior of the camera module 350. For example, the camera housing 352 may be formed to surround the lens assembly 351 from the outside.

In one embodiment, various circuits for driving the camera module 350 may be formed or electronic components may be disposed on the second PCB 353. For example, the image processor 354 (e.g., the ISP 260 of FIG. 2), an image sensor (e.g., the image sensor 230 of FIG. 2), a memory (e.g., the memory 250 of FIG. 2, for example, a buffer memory and/or electrically erasable programmable read-only memory (EEPROM)), and/or a multilayer ceramic condenser (MLCC) may be disposed on the second PCB 353. However, this is merely an example, and a configuration of disposed on the second PCB 353 is not limited thereto. The second PCB 353 may be positioned on a lower side (e.g., −z direction side) of the camera module 350. For example, the second PCB 353 may be connected to the lower side (e.g., the −z direction side) of the camera housing 352.

Referring to FIGS. 3D to 3I, in one embodiment, the first PCB 340 may include an opening 341, a first connecting terminal 342, and one or more projection insertion grooves 343.

In one embodiment, the opening 341 may be formed at a position where the camera module 350 is disposed on the first PCB 340. The opening 341 may be formed to penetrate through the first PCB 340. The connecting interface 400, as described below, may be inserted into the opening 341. For example, the opening 341 may be formed in a quadrangular shape. However, this is merely an example, and the position and/or the shape of the opening 341 is not limited thereto.

In one embodiment, the first connecting terminal 342 may be a terminal formed on the first PCB 340 to electrically connect the first PCB 340 to the camera module 350. The first connecting terminal 342 may be electrically connected to a circuit formed on the first PCB 340 and/or an electronic component disposed on the first PCB 340. One or a plurality of first connecting terminals 342 may be provided (e.g., 24 first connecting terminals 342, as depicted in FIG. 3E). The plurality of first connecting terminals 342 may be disposed to be spaced apart from each other along the circumference of the opening 341. For example, the number of first connecting terminals 342 provided is 24 and six first connecting terminals 342 may be disposed to be spaced apart on each inner wall of the opening 341. However, this is an example, and the number and/or the position of the first connecting terminals 342 is not limited thereto. In some embodiments, only a single first connecting terminal 342 may be provided. In some embodiments, only a single first connecting terminals 342 may be provided on each inner wall of the opening 341. In some embodiments, a same number of first connecting terminals 342 is disposed on each respective inner wall of the opening 341. In some embodiments, a different number of first connecting terminals 342 is disposed on each respective inner wall of the opening 341.

In one embodiment, the first connecting terminal 342 may be formed on the inner wall of the opening 341 by plating. For example, the first connecting terminal 342 may be formed on an upper side surface (e.g., a surface in the +z direction), a side surface (e.g., a surface in an x and/or y direction), and/or a lower side surface (e.g., a surface in the −z direction) of the first PCB 340 adjacent to the circumference of the opening 341 by plating. However, this is merely an example, and the plating position and/or the formation method of the first connecting terminal 342 is not limited thereto.

In one embodiment, at least one projection insertion groove 343 may be recessed in the first PCB 340 at a position adjacent to the opening 341. The projection insertion groove 343 may be a groove into which an insertion projection 413 of the connecting interface 400, as described below is inserted. Based on a state where the connecting interface 400 is inserted into the opening 341, the projection insertion groove 343 may be formed at a position corresponding to the insertion projection 413. The number of projection insertion grooves 343 that may be formed corresponds to the number of insertion projections 413. The projection insertion groove 343 may be formed at a position adjacent to each corner of the opening 341. However, this is merely an example, and the shape, the position, and/or the number of the projection insertion groove 343 is not limited thereto. For example, the projection insertion groove 343 may be formed to penetrate the first PCB 340.

Referring to FIGS. 3D to 3I, in one embodiment, the connecting interface 400 may connect the camera module 350 to the first PCB 340. For example, the connecting interface 400 may electrically connect the camera module 350 to the first PCB 340 while fixedly connect the camera module 350 to the first PCB 340 at the same time.

In one embodiment, the connecting interface 400 may be connected to a lower side (e.g., the −z direction side) of the camera module 350. For example, the connecting interface 400 may be connected to the second PCB 353 of the camera module 350. For example, the connecting interface 400 may be electrically connected to the second PCB 353 through soldering. In one embodiment, the second PCB 353 of the camera module 350 may be electrically connected to each of second connecting terminals 420 via a jack type, a terminator, an adapter, or a coupling member on an upper surface (e.g., a surface in the +z direction) of an interface body 410.

In one embodiment, the connecting interface 400 may include the interface body 410 and the second connecting terminals 420.

In one embodiment, the interface body 410 may form an outer shape of the connecting interface 400. The interface body 410 may be inserted into the opening 341 of the first PCB 340. The interface body 410 may be connected to a lower side (e.g., the −z direction side) of the camera module 350.

In one embodiment, the interface body 410 may include a main body 411, a flange 412, an insertion projection 413, and a terminal connector 414.

In one embodiment, the main body 411 may be a portion that is substantially inserted into the opening 341 of the first PCB 340. The main body 411 may be formed in a size and/or shape substantially corresponding to those of the opening 341. For example, the main body 411 may be formed in a hexahedral shape. However, this is merely an example, and the shape of the main body 411 is not limited thereto.

In one embodiment, the flange 412 may be formed to extend in an outward direction from a circumference of an upper portion (e.g., portion in the +z direction) of the main body 411. For example, the flange 412 may be formed to extend from an entire portion or a portion of a circumference of an upper end (e.g., an end portion in the +z direction) of the main body 411 in the outward direction by a designated length. For example, the flange 412 may be integrally formed with the main body 411. When the main body 411 is inserted into the opening 341 of the first PCB 340, the flange 412 may not be inserted into the opening 341, but may be placed on an upper surface (e.g., a surface in the +z direction) of the first PCB 340. By the above structure, the flange 412 may limit a degree to which the interface body 410 is inserted into the opening 341 and may prevent the interface body 410 from being over-inserted into the opening 341.

In one embodiment, the insertion projection 413 may be formed to protrude in a downward direction (e.g., the −z direction) from the flange 412. The insertion projection 413 may be integrally formed with the flange 412 or may be formed as a separate component. The insertion projection 413 may be formed in a size, shape, number, and/or position substantially corresponding to those of the projection insertion groove 343 formed in the first PCB 340. The insertion projection 413 may be inserted into the projection insertion groove 343. For example, the insertion projection 413 may be formed at a corner of the flange 412. The insertion projection 413 may prevent the connecting interface 400 from tilting with respect to the first PCB 340. For example, since the insertion projection 413 is inserted into the projection insertion groove 343, the connecting interface 400 may be prevented from tilting in the z direction with respect to the first PCB 340.

In one embodiment, the insertion projection 413 may guide the connecting interface 400 to be inserted into the opening 341 in a correct direction. For example, the insertion projection 413 may be formed on only some of the corners of the flange 412. For example, in a case where the flange 412 has four corners, three insertion projections 413 may be formed. The projection insertion grooves 343 may be formed at the positions and numbers corresponding to those of the insertion projections 413. According to this structure, the insertion projection 413 may not be inserted into the projection insertion groove 343 in a wrong direction (e.g., the direction in which the connecting interface 400 is rotated by 90 degrees or 180 degrees about a z axis from the correct direction), and accordingly, erroneous insertion of the connecting interface 400 may be prevented.

In one embodiment, the terminal connector 414 may be a portion for connecting the second connecting terminal 420 to the interface body 410. The number of terminal connectors 414 that may be formed corresponds to the number of the second connecting terminals 420. For example, a plurality of terminal connectors 414 may be formed. The plurality of terminal connectors 414 may be formed to be spaced apart from each other along the circumference of the main body 411 and the flange 412. For example, the plurality of terminal connectors 414 may be formed on the circumference of the interface body 410 in an arrangement substantially corresponding to the arrangement in which the first connecting terminals 342 are disposed in the opening 341. For example, the number of terminal connectors 414 formed may be 24 and six terminal connectors 414 may be formed to be spaced apart from each other at each edge of the interface body 410. However, this is merely an example, and the number and/or position of the terminal connectors 414 is not limited thereto.

In one embodiment, the terminal connector 414 may include a first groove 4141, a through-hole 4142, a second groove 4143, and an expansion groove 4144. Hereinafter, in describing the terminal connector 414 according to one embodiment, the terminal connector 414 shown in FIG. 3G is described as a reference for convenience of description.

In one embodiment, the first groove 4141 may be fixed to the main body 411. The first groove 4141 may be recessed in an upper surface (e.g., a surface in the +z direction) of the main body 411. The longitudinal direction of the first groove 4141 may be the horizontal direction (e.g., an x direction). For example, the first groove 4141 may be formed to extend in a direction toward an inner side (e.g., a −x direction) from an end portion of an edge of the upper portion (e.g., portion in the +z direction) of the main body 411. A first portion 421 of the second connecting terminal 420, as described below, may be inserted into the first groove 4141 to be positioned therein. The length (e.g., the length in the x direction) of the first groove 4141 extending to the inside may be substantially longer than or equal to the length of the first portion 421 of the second connecting terminal 420. The first groove 4141 may be recessed by a specified depth. For example, the depth at which the first groove 4141 is recessed may be substantially greater than or equal to the thickness of the first portion 421 of the second connecting terminal 420. However, this is merely an example, and the position, shape, and/or size of the first groove 4141 is not limited thereto.

In one embodiment, the through-hole 4142 may be formed to penetrate the flange 412 in a vertical direction (e.g., the z direction) at a position communicating with the first groove 4141. For example, the through-hole 4142 may be formed to communicate with an outer end portion (e.g., an end portion in the +x direction) of the first groove 4141. A second portion 422 of the second connecting terminal 420, as described below, through the through-hole 4142 may be positioned to penetrate the flange 412. In addition, the through-hole 4142 may be formed to substantially penetrate the main body 411.

In one embodiment, the second groove 4143 may be recessed in a side surface (e.g., a surface in the +x direction) of the main body 411. For example, the longitudinal direction of the second groove 4143 may be the vertical direction (e.g., the z direction). The second groove 4143 may be formed at a position substantially corresponding to the first groove 4141. A hook portion 423 of the second connecting terminal 420, as described below, may be positioned in the second groove 4143.

In one embodiment, the second connecting terminal 420 may be a terminal connected to the interface body 410 to electrically connect the first PCB 340 to the camera module 350. The second connecting terminal 420 may be a terminal to be electrically connected to the first connecting terminal 342 formed in the opening 341 of the first PCB 340. For example, at least a portion of the second connecting terminal 420 may be electrically connected to the first connecting terminal 342 and at least another portion of the second connecting terminal 420 may be electrically connected to the second PCB 353 and/or an electronic component (e.g., the image processor 354) disposed on the second PCB 353.

In one embodiment, one or a plurality of second connecting terminals 420 may be provided. The number of second connecting terminals 420 that may be formed corresponds to the number of first connecting terminals 342. The plurality of second connecting terminals 420 may be disposed to be spaced apart from each other along the circumference of the interface body 410. The second connecting terminal 420 may be disposed to be inserted into the terminal connector 414 formed on the interface body 410. For example, the plurality of second connecting terminals 420 may be disposed on the circumference of the interface body 410 in an arrangement substantially corresponding to the arrangement in which the first connecting terminals 342 are disposed in the opening 341. For example, the number of second connecting terminals 420 may be 24 and six second connecting terminals 420 may be disposed to be spaced apart at each edge of the interface body 410. However, this is merely an example, and the number and/or position of the second connecting terminals 420 is not limited thereto.

In one embodiment, the second connecting terminal 420 may be formed of an elastic material. For example, the second connecting terminal 420 may have a restoring force for restoring a material to an initial state thereof, by its own elastic force. The initial state described above may refer to a state in which no external force is applied to the second connecting terminal 420.

In one embodiment, the second connecting terminal 420 may include the first portion 421, the second portion 422, and the hook portion 423. Hereinafter, in describing the second connecting terminal 420 according to one embodiment, the second connecting terminal 420 shown in FIG. 3G is described as a reference for convenience of description.

In one embodiment, the first portion 421 may be positioned on an upper side (e.g., a side in the +z direction) of the interface body 410 in the horizontal direction (e.g., the x direction). For example, the first portion 421 may be disposed to be inserted into the first groove 4141 of the interface body 410. For example, the first portion 421 may be disposed in the form of a hook fitted to an injection mold. For example, the interface body 410 may be formed through an injection process and the first portion 421 may be inserted into and connected fixedly to an injection portion of the interface body 410 by a hook shape that is formed on an inner end portion (e.g., an end portion in the −x direction) of the first portion 421. At least a portion of the first portion 421 may be electrically connected to the second PCB 353. For example, at least the inner end portion (e.g., the end portion in the −x direction) of the first portion 421 may be electrically connected to an electronic component (e.g., the image processor 354) disposed on the second PCB 353. A soldering process may be performed on at least a portion of the first portion 421. For example, a solder member S may be applied to the inner end portion (e.g., the end portion in the −x direction) of the first portion 421. The first portion 421 may be electrically connected to the second PCB 353 through the solder member S. However, this is merely an example, and a position on the first portion 421 at which the soldering process is performed is not limited thereto.

In one embodiment, the second portion 422 may be bent and extend from an outer end portion (e.g., an end portion in the +x direction) of the first portion 421. For example, the second portion 422 may be bent and extend substantially in the down (e.g., the −z direction) from the first portion 421 disposed in the horizontal direction (e.g., the x direction). The second portion 422 may penetrate through the flange 412 in a substantially downward direction (e.g., the −z direction) through the through-hole 4142 formed in the interface body 410. The second portion 422 may be positioned substantially in a lateral direction (e.g., the +x direction) of the interface body 410.

In one embodiment, a bending angle A1 between the first portion 421 and the second portion 422 may be elastically changeable by the elastic force of the second connecting terminal 420. For example, in the initial state, the bending angle A1 between the first portion 421 and the second portion 422 may be 90 degrees or more. For example, the bending angle A1 between the first portion 421 and the second portion 422 may be about 95 degrees. However, this is merely an example, and the bending angle A1 between the first portion 421 and the second portion 422 in the initial state is not limited thereto.

In one embodiment, the hook portion 423 may be formed on one end portion (e.g., an end portion in the −z direction) of the second portion 422. The hook portion 423 may have a hook shape. The hook portion 423 may be substantially bent and formed in a hook shape from the one end portion (e.g., the one end in the −z direction) of the second portion 422. An angle A2 of a portion of the hook portion 423 bent from the second portion 422 may be formed as an obtuse angle toward the outward direction (e.g., the +x direction). For example, the angle A2 of the portion of the hook portion 423 bent from the second portion 422 may be about 135 degrees. However, this is merely an example, and the angle A2 of the portion of the hook portion 423 bent from the second portion 422 is not limited thereto. The hook portion 423 may be positioned to protrude in a relatively more outward direction (e.g., the +x direction) with respect to the second portion 422. At least a portion of the hook portion 423 may be positioned to be inserted into the second groove 4143 formed in a side surface (e.g., a surface in the +x direction) of the interface body 410. However, this is merely an example, and the hook portion 423 may be positioned without being inserted into the second groove 4143.

In one embodiment, the terminal connector 414 may further include a fixing groove (not shown) and the second connecting terminal 420 may further include a fixing portion (not shown). For example, the fixing groove may be recessed in the downward direction (e.g., the −z direction) from an inner end portion (e.g., an end portion in the −x direction) of the first groove 4141. The fixing portion may be bent and extend in the downward direction (e.g., the −z direction) from the inner end portion (e.g., the end portion in the −x direction) of the first portion 421. For example, an end portion of the fixing portion may be formed in a hook shape. Since the fixing portion of the second connecting terminal 420 is inserted into the fixing groove of the terminal connector 414, the second connecting terminal 420 may be fixedly connected to the interface body 410. However, this is merely an example, and the structure in which the second connecting terminal 420 is fixedly connected to the interface body 410 is not limited thereto.

Figure 3J:
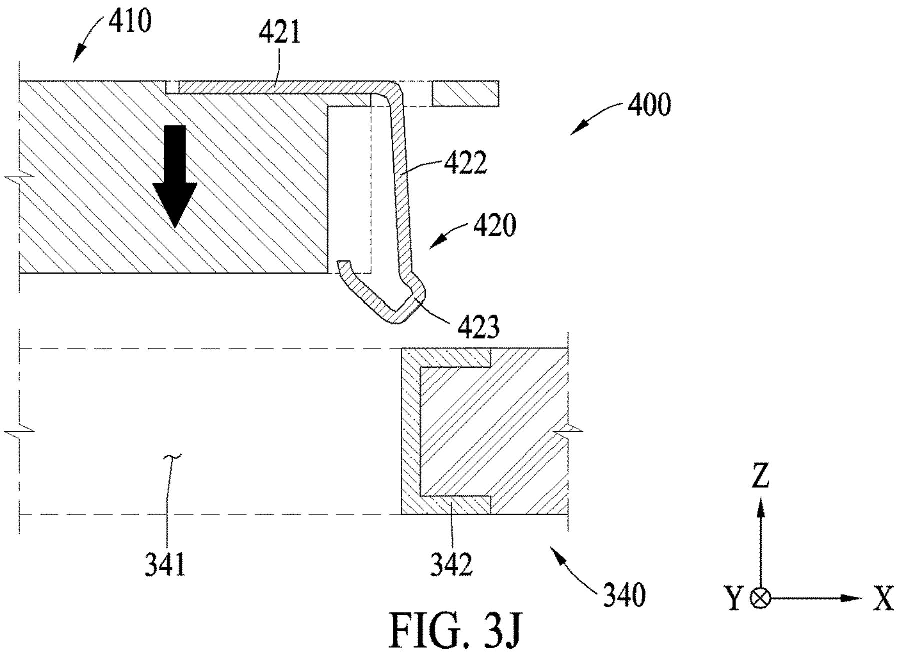
FIGS. 3J, 3K, and 3L illustrate sequential steps in a process in which a connecting interface is inserted and fixed with respect to an opening of a first PCB according to one embodiment.
Figure 3K:
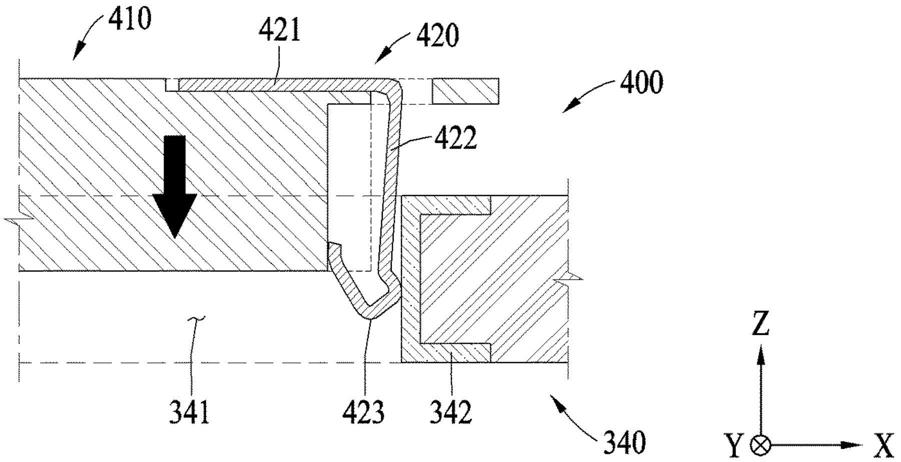
Figure 3L:
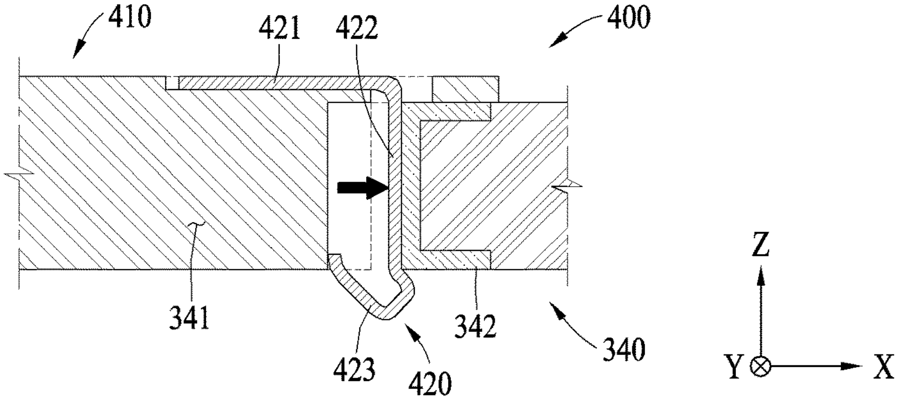

FIGS. 3J, 3K, and 3L illustrate sequential steps in a process in which a connecting interface is inserted and fixed with respect to an opening of a first PCB according to one embodiment;

Referring to FIGS. 3J and 3K, in one embodiment, the connecting interface 400 may be inserted and fixed in the opening 341 of the first PCB 340. For example, the interface body 410 may be inserted into the opening 341 in a direction from an upper side to a lower side (e.g., the −z direction) thereof.

As shown in FIG. 3L, during a process in which the interface body 410 is inserted downward (e.g., the −z direction) into the opening 341, the hook portion 423 may be in sliding contact with the first connecting terminal 342. At this time, since the hook portion 423 protrudes in a relatively more outward direction (e.g., the +x direction) than the second portion 422, the second portion 422 may be further bent elastically with respect to the first portion 421 in a direction in which the bending angle becomes smaller than that in the initial state thereof, due to the contact between the hook portion 423 and the first connecting terminal 342. For example, during the process in which the connecting interface 400 is inserted into the opening 341, the bending angle between the second portion 422 and the first portion 421 may be substantially smaller than 90 degrees due to the contact between the hook portion 423 and the first connecting terminal 342.

As shown in FIG. 3L, when the connecting interface 400 is completely inserted into the opening 341, the hook portion 423 may be positioned by completely passing through the opening 341. When the connecting interface 400 is completely inserted into the opening 341, the second portion 422 may be substantially in surface contact with the first connecting terminal 342 and may be bent with respect to the first portion 421 at a smaller angle than that in the initial state thereof. For example, when the connecting interface 400 is completely inserted into the opening 341, the second portion 422 may be bent substantially at 90 degrees with respect to the first portion 421. According to this state, the second connecting terminal 420 may generate its own elastic force in a direction in which the second portion 422 is pressed toward the first connecting terminal 342. For example, since the second portion 422 is further bent with respect to the first portion 421, compared to the initial state thereof, the second connecting terminal 420 may generate the restoring force for restoring a material to an initial state (e.g., its own elastic force) thereof so that the second portion 422 is pressed toward the first connecting terminal 342. In addition, when the connecting interface 400 is completely inserted into the opening 341, the hook portion 423 may be positioned to pass through the opening 341 to support a lower side (e.g., a side in the −z direction) of the first connecting terminal 342. Since the second connecting terminals 420 are disposed to be spaced apart from each other along the circumference of the connecting interface 400, when the connecting interface 400 is completely inserted into the opening 341, a relative position of the connecting interface 400 with respect to the opening 341 may be fixed by the elastic force of the second connecting terminal 420. As a result, when the connecting interface 400 is completely inserted into the opening 341, the first connecting terminal 342 and the second connecting terminal 420 may be electrically connected to each other and at the same time, the relative position of the connecting interface 400 with respect to the opening 341 may be fixed by the elastic force of the second connecting terminal 420. In addition, since the connecting interface 400 is disposed in a vertical direction (e.g., the z direction) to the camera module (e.g., the camera module 350 of FIG. 3C), the space may be efficiently used when disposing the camera module 350 on the first PCB 340. In addition, since a separate socket for fixing the camera module 350 is not required, the number of components may be reduced and the cost may be reduced.

Figure 3M:
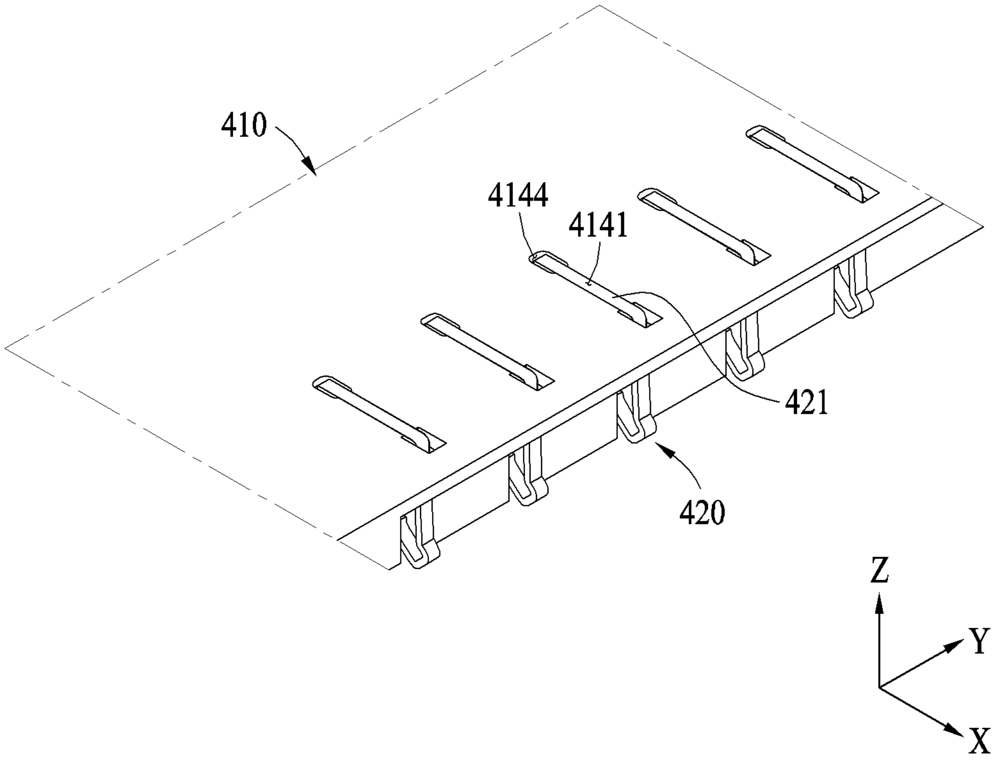
FIG. 3M is an enlarged perspective view illustrating a portion of a connecting interface according to one embodiment.

FIG. 3M is an enlarged perspective view illustrating a portion of the connecting interface according to one embodiment.

Referring to FIG. 3M, the expansion groove 4144 according to one embodiment may be formed by extending the inner end portion (e.g., the end portion in the −x direction) of the first groove 4141. For example, the expansion groove 4144 may extend and be formed to have a larger width (e.g., a width in a y direction) than that of the first groove 4141. For example, the expansion groove 4144 may be formed to further extend in the longitudinal direction (e.g., the −x direction) from the inner end portion (e.g., the end portion in the −x direction). When the first portion 421 of the second connecting terminal 420 is inserted into the first groove 4141, a free space may be obtained between the inner end portion (e.g., the end portion in the −x direction) of the first portion 421 and the first groove 4141 due to the expansion groove 4144. For example, when the first portion 421 of the second connecting terminal 420 is inserted into the first groove 4141, the first portion 421 may be positioned to be spaced apart from an inner wall of the interface body 410. According to this structure, when a solder member (e.g., the solder member S of FIG. 3H) is applied to the inner end portion (e.g., the end portion in the −x direction) of the first portion 421 for electrical connection with the second PCB (e.g., the second PCB 353 of FIG. 3H), at least a portion of the solder member S may flow to the expansion groove 4144. Since at least a portion of the solder member S flows into the expansion groove 4144, the solder member S may be prevented from floating to an upper side (e.g., a side in the +z direction) of the first portion 421. Moreover, the expansion groove 4144 may also be formed on the outer end portion (e.g., the end portion in the +x direction) of the first groove 4141.

Figure 3N:
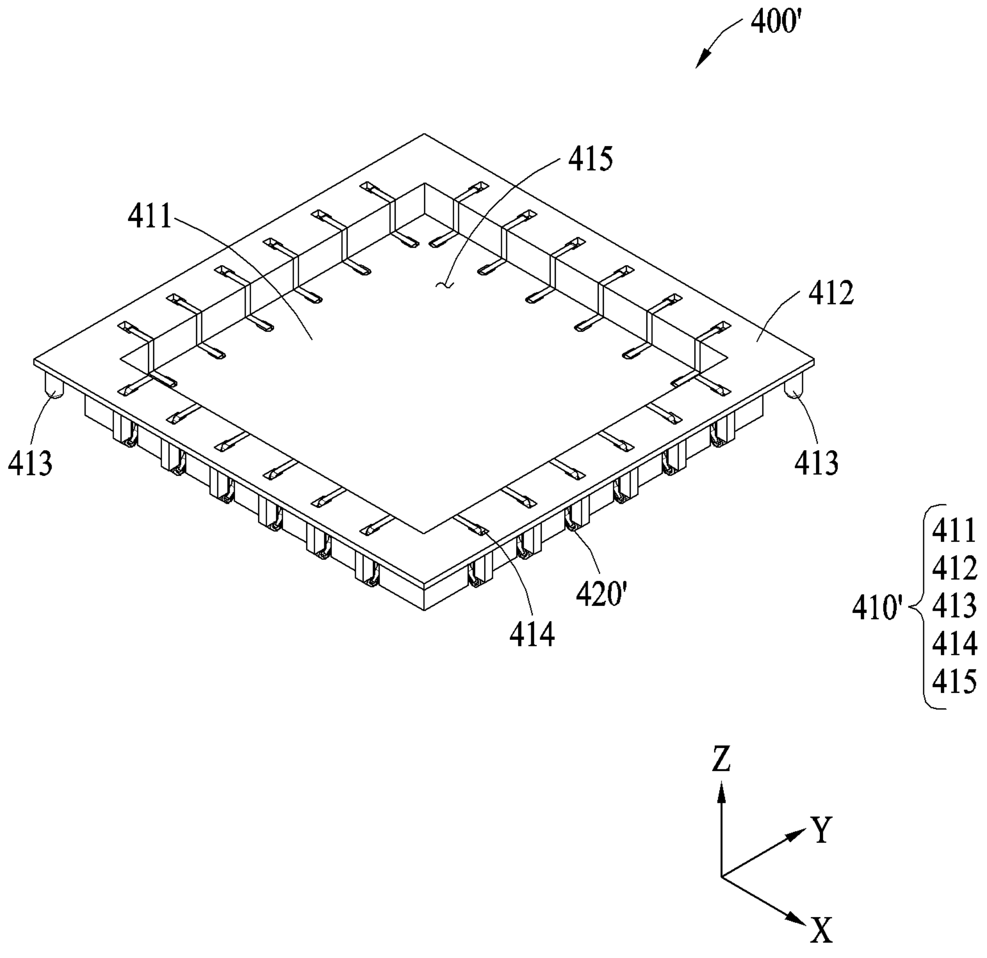
FIG. 3N is a perspective view of a connecting interface according to one embodiment.
Figure 3O:
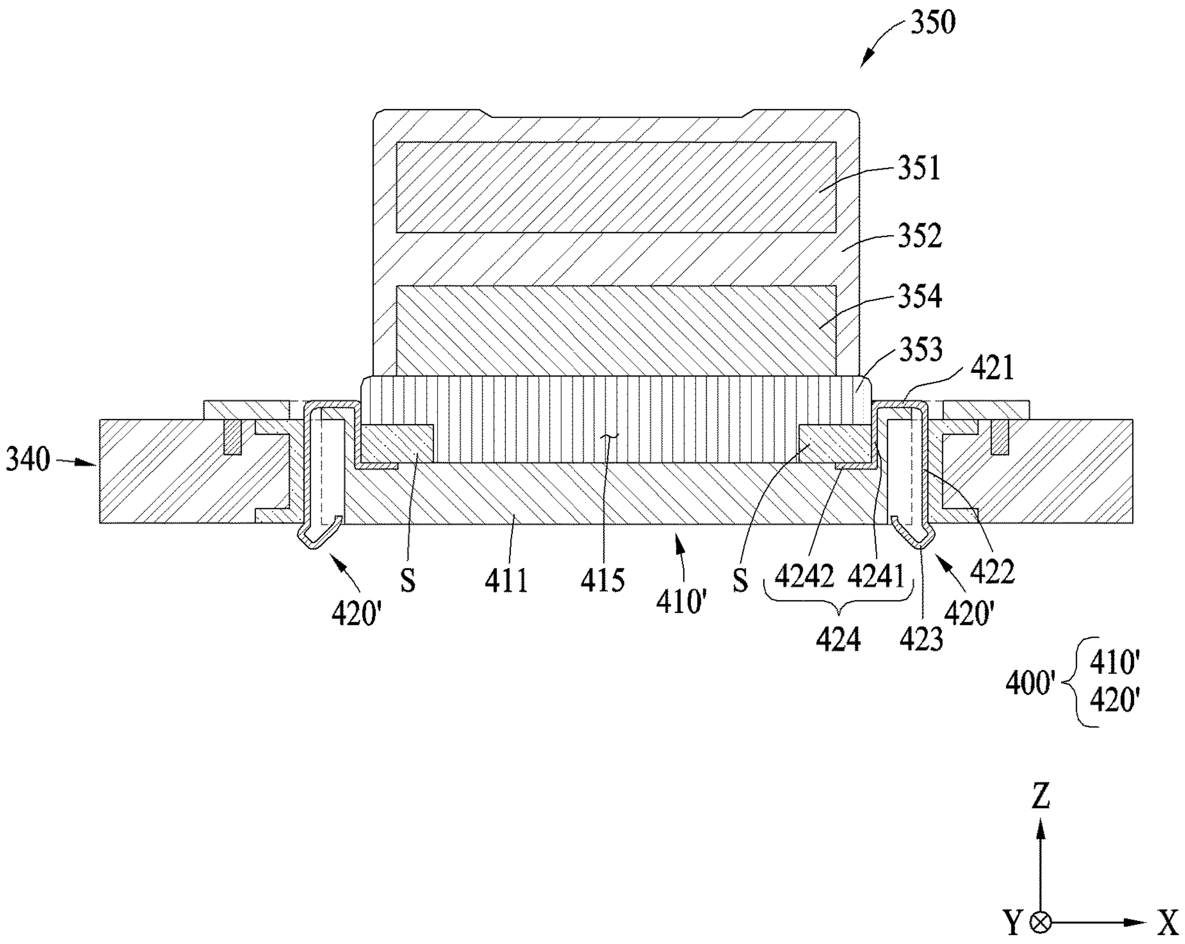
FIG. 3O is a schematic cross-sectional view illustrating a state after a camera module and a connecting interface are coupled to a first PCB according to one embodiment.

FIG. 3N is a perspective view of a connecting interface according to one embodiment. FIG. 3O is a schematic cross-sectional view illustrating a state after a camera module and a connecting interface are coupled to a first PCB according to one embodiment.

Referring to FIGS. 3N and 3O, a connecting interface 400' according to one embodiment may include an interface body 410' and a second connecting terminal 420'. Hereinafter, in describing one embodiment according to FIGS. 3N and 3O, the descriptions of one embodiment provided with reference to FIGS. 3A to 3M apply here, unless otherwise stated.

In one embodiment, the interface body 410' may include a main body 411, a flange 412, an insertion projection 413, a terminal connector 414, and a recessed portion 415. The recessed portion 415 may be recessed in a downward direction (e.g., the −z direction) from an upper surface (e.g., a surface in the +z direction) of the main body 411. The shape of the recessed portion 415 may correspond to a shape of at least a portion (e.g., a lower portion (e.g., a portion in the −z direction)) of the second PCB 353 of the camera module 350. At least a portion of the second PCB 353 may be disposed to be inserted into the recessed portion 415.

In one embodiment, the second connecting terminal 420' may include a first portion 421, a second portion 422, a hook portion 423, and an extension 424. The extension 424 may be a portion extending along the recessed portion 415 from the inner end portion of the first portion 421. For example, the extension 424 may include a first extension 4241 and a second extension 4242. The first extension 4241 may extend from the inner end portion of the first portion 421 in a vertical direction (e.g., the −z direction) along a side surface of the recessed portion 415. The second extension 4242 may extend from an end portion of the first extension 4241 in a horizontal direction (e.g., the x or y direction) along an upper surface (e.g., a surface in the +z direction) of the space recessed by the recessed portion 415. A soldering process may be performed on at least a portion of the extension 424. For example, the soldering member S may be applied to at least one of the first extension 4241 or the second extension 4242. At least one of the first extension 4241 or the second extension 4242 may be electrically connected to the second PCB 353 through the solder member S. However, this is merely an example, and the position of the extension 424 at which the soldering process is performed is not limited thereto.

In one embodiment, according to the structure shown in FIGS. 3N and 3O, the camera module 350 may be inserted more deeply into the connecting interface 400'. Accordingly, a total height of an assembly in the z direction may be further lowered when the camera module 350 is inserted into the first PCB 340, and space utilization may increase.

Figure 4A:
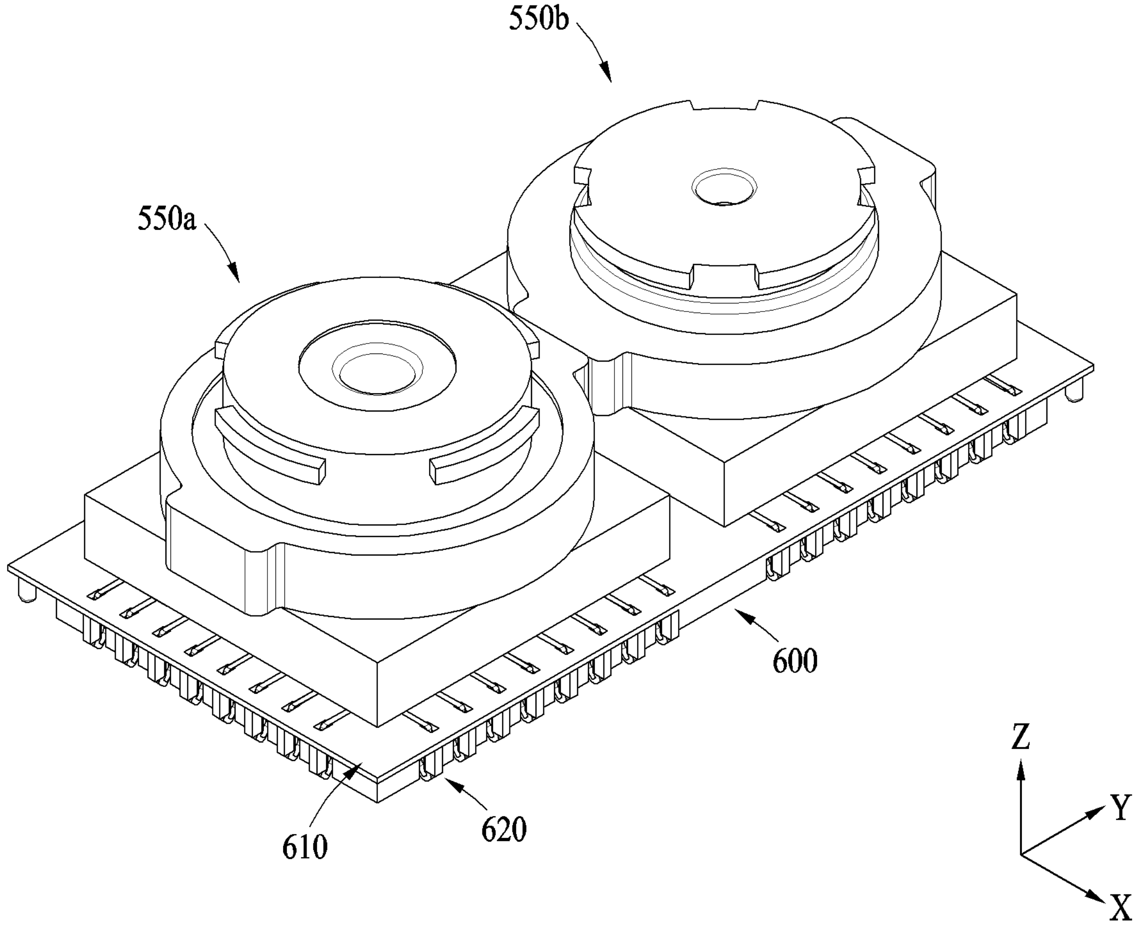
FIG. 4A is a perspective view illustrating a state in which a camera module is combined with a connecting interface according to one embodiment.
Figure 4B:
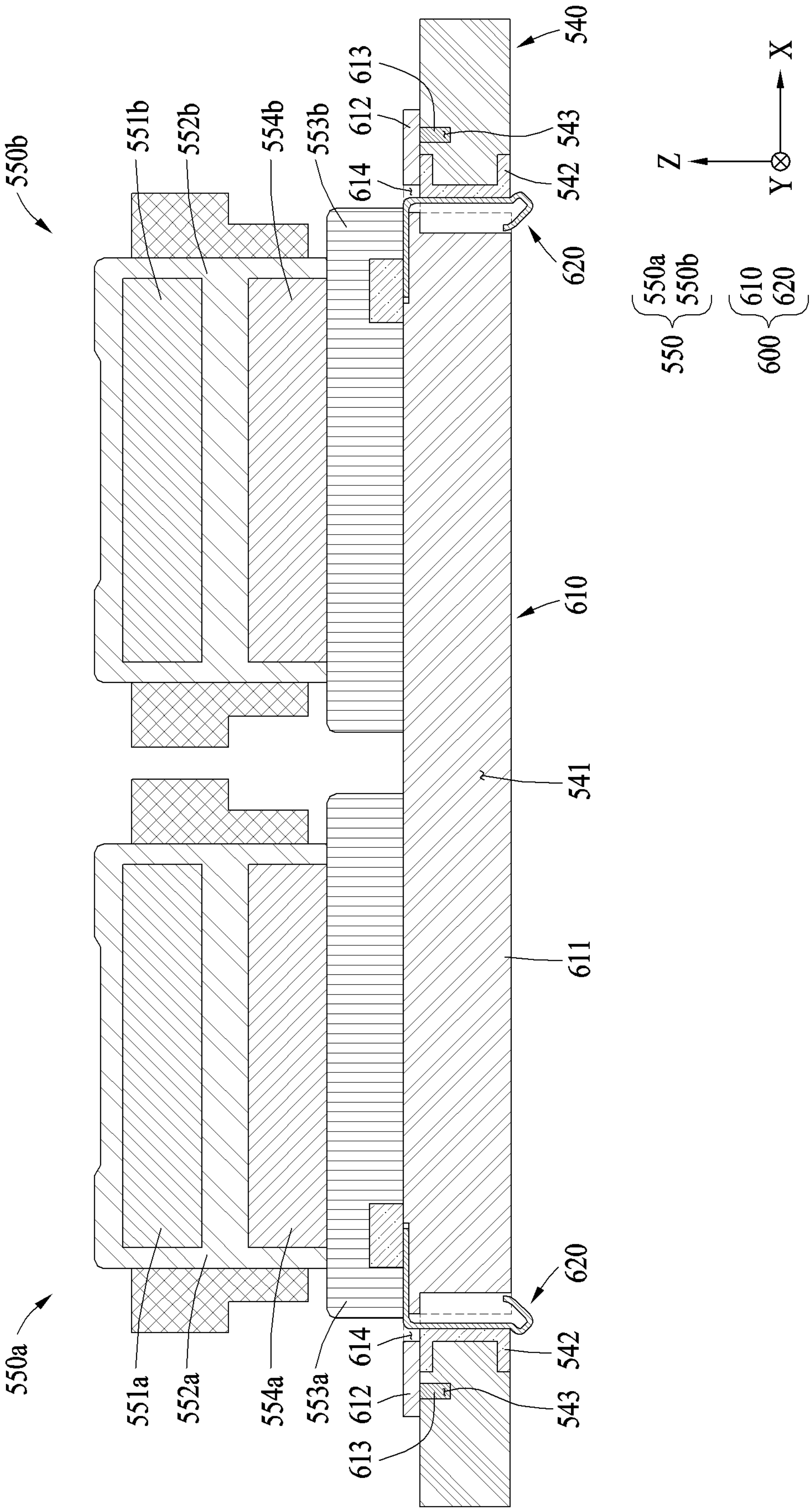
FIG. 4B is a schematic cross-sectional view of a state after a camera module and a connecting interface are coupled to a first PCB according to one embodiment.

FIG. 4A is a perspective view illustrating a state in which a camera module is combined with a connecting interface according to one embodiment, FIG. 4B is a schematic cross-sectional view of a state after a camera module and a connecting interface are coupled to a first PCB according to one embodiment. Hereinafter, in describing one embodiment according to FIGS. 4A and 4B, the descriptions of one embodiment provided with reference to FIGS. 3A to 3M apply here, unless otherwise stated.

Referring to FIGS. 4A and 4B, an electronic device (e.g., the electronic device 101 of FIG. 1) according to one embodiment may include a first PCB 540 (e.g., the first PCB 340 of FIG. 3C), a camera module 550 (e.g., the camera module 350 of FIG. 3C), and a connecting interface 600 (e.g., the connecting interface 400 of FIG. 3C).

In one embodiment, the first PCB 540 may include an opening 541, a first connecting terminal 542, and a projection insertion groove 543. The connecting interface 600, as described below, may be inserted into the opening 541. The opening 541 may be formed in a size and/or shape corresponding to those of the connecting interface 600. For example, the opening 541 may have a substantially rectangular shape in which one side is longer than the other side. However, this is merely an example, and the shape of the opening 541 is not limited thereto.

In one embodiment, the first connecting terminal 542 may be a terminal formed on the first PCB 540 to electrically connect the first PCB 540 to the camera module 550. The first connecting terminal 542 may be electrically connected to a circuit formed on the first PCB 540 and/or an electronic component disposed on the first PCB 540. One or a plurality of first connecting terminals 542 may be provided. The plurality of first connecting terminals 542 may be disposed to be spaced apart from each other along the circumference of the opening 541. For example, the number of first connecting terminals 542 may be 48, 8 first connecting terminals 542 may be disposed to be spaced apart on a short side of the opening 541, and 16 first connecting terminals 542 may be disposed to be spaced apart on a long side thereof. However, this is merely an example, and the number and/or position of the first connecting terminals 542 is not limited thereto.

In one embodiment, a plurality of camera modules 550 may be provided. For example, the camera module 550 may include a first camera module 550*a* and a second camera module 550*b*. The first camera module 550*a* and the second camera module 550*b* may be positioned adjacent to each other. However, this is merely an example, and the number of camera modules 550 is not limited thereto.

In one embodiment, the first camera module 550*a* may include a first lens assembly 551*a*, a first camera housing 552*a*, a second PCB 553*a*, and a first image processor 554*a*. The second camera module 550*b* may include a second lens assembly 551*b*, a second camera housing 552*b*, a third PCB 553*b*, and a second image processor 554*b*. In addition, the first camera housing 552*a* and the second camera housing 552*b* may be substantially integrally formed. The second PCB 553*a* and the third PCB 553*b* may be substantially formed of one PCB.

In one embodiment, the connecting interface 600 may include an interface body 610 and a second connecting terminal 620.

In one embodiment, the interface body 610 may include a main body 611, a flange 612, an insertion projection 613, and a terminal connector 614. The main body 611 may be formed in a size and/or shape substantially corresponding to the opening 541. For example, the main body 611 may be substantially formed in a cuboid shape in which one side is longer than the other side. However, this is merely an example, and the shape of the main body 611 is not limited thereto.

In one embodiment, the second connecting terminal 620 may be a terminal connected to the interface body 610 to electrically connect the first PCB 540 to the camera module 550. The second connecting terminal 620 may be a terminal electrically connected to the first connecting terminal 542 formed in the opening 541 of the first PCB 540. For example, at least a portion of the second connecting terminal 620 may be electrically connected to the first connecting terminal 542 and at least another portion of the second connecting terminal 620 may be connected to the second PCB 553*a* and/or the third PCB 553*b*.

In one embodiment, one or a plurality of second connecting terminals 620 may be provided. The number of second connecting terminals 620 corresponds to the number of first connecting terminals 542. The plurality of second connecting terminals 620 may be disposed to be spaced apart from each other along the circumference of the interface body 610. For example, the plurality of second connecting terminals 620 may be disposed on the circumference of the interface body 610 in an arrangement substantially corresponding to the arrangement in which the first connecting terminals 542 are disposed in the opening 541. For example, the number of second connecting terminals 620 may be 48, 8 second connecting terminals 620 may be disposed to be spaced apart on a short side of the interface body 610, and 16 second connecting terminals 620 may be disposed to be spaced apart on a long side thereof. However, this is merely an example, and the number and/or position of the second connecting terminals 620 is not limited thereto.

In one embodiment, the second connecting terminal 620 may be formed of an elastic material. For example, the second connecting terminal 620 may have a restoring force for restoring the second connecting terminal 620 to an initial state thereof by own elastic force of the second connecting terminal 620. The initial state described above may refer to a state in which no external force is applied to the second connecting terminal 620.

In one embodiment, the first camera module 550*a* and the second camera module 550*b* may be connected to an upper surface (e.g., a surface in the +z direction) of the interface body 610. For example, the second PCB 553*a* of the first camera module 550*a* and the third PCB 553*b* of the second camera module 550*b* may be electrically connected to the second connecting terminals 620, respectively, through soldering performed on the upper surface (e.g., the surface in the +z direction) of the interface body 610. In one embodiment, the second PCB 553*a* of the first camera module 550*a* through a jack type, a terminator, an adapter, or a coupling member on the upper surface (e.g., the +z direction surface) of the interface body 610) and the third PCB 553*b* of the second camera module 550*b* may be electrically connected to the second connecting terminal 620, respectively.

In one embodiment, according to the structure shown in FIGS. 4A and 4B, the plurality of camera modules 550 (e.g., the first camera module 550*a* and the second camera module 550*b*) may be electrically connected and fixedly connected to the first PCB 540 at the same time through one connecting interface 600, thereby improving space utilization.

Furthermore, in describing the connecting interfaces 400, 400', and 600 according to one embodiment with reference to FIGS. 3A to 4B, although it is described that the connecting interfaces 400, 400', and 600 are components for connecting the camera modules 350, 550*a*, and 550*b* to the first PCBs 340 and 540, this is merely an example, and the connecting interfaces 400, 400', and 600 are not limited to only be applied to the camera modules 350, 550*a*, and 550*b*. For example, the connecting interfaces 400, 400', and 600 may be applied to connect an electrical object including a separate PCB to the first PCBs 340 and 540. For example, the connecting interfaces 400, 400', and 600 may be applied to connect an optical fingerprint module to the first PCBs 340 and 540.

According to one embodiment, an electronic device 301 includes a first PCB 340 including an opening 341, and a plurality of first connecting terminals 342 disposed to be spaced apart from each other along a circumference of the opening 341, a camera module 350 including a second PCB 353, and a connecting interface 400 including an interface body 410 connected to a lower end of the camera module 350, and a plurality of second connecting terminals 420 formed of an elastic material and disposed to be spaced apart from each other along a circumference of the interface body 410 to be electrically connected to the second PCB 353, wherein the connecting interface 400 is inserted into the opening 341 so that each first connecting terminal 342 of the plurality of first connecting terminals 342 is electrically connected to one respective second connecting terminal 420 of the plurality of second connecting terminals 420, and a relative position of the connecting interface 400 with respect to the opening 341 is fixed by an elastic force of the plurality of second connecting terminals 420.

In one embodiment, each second connecting terminal 420 of the plurality of second connecting terminals 420 may include a first portion 421 disposed on an upper side of the interface body 410 in a horizontal direction, and a second portion 422 bent and extending from one end portion of the first portion 421 to be disposed in a lateral direction of the interface body 410.

In one embodiment, a bending angle between the first portion 421 and the second portion 422 in an initial state may be 90 degrees or more, and the bending angle A1 between the first portion 421 and the second portion 422 may be elastically changeable by an elastic force of the respective second connecting terminal 420.

In one embodiment, each second connecting terminal 420 of the plurality of second connecting terminals 420 may further include a hook portion 423 formed at one end portion of the second portion 422.

In one embodiment, in a process in which the connecting interface 400 is inserted into the opening 341, the second portion 422 may be elastically bent with respect to the first portion 421 in a direction in which the bending angle A1 becomes smaller than the initial state due to contact between the hook portion 423 and the respective first connecting terminal 342.

In one embodiment, when the connecting interface 400 is completely inserted into the opening 341, each second connecting terminal 420 of the plurality of second connecting terminals 420 may generate its own elastic force in a direction in which the second portion 422 is pressed toward the first connecting terminal 342.

In one embodiment, when the connecting interface 400 is completely inserted into the opening 341, the respective hook portion 423 may support a lower side of the respective first connecting terminal 342.

In one embodiment, the interface body 410 may include a main body 411 formed in a size corresponding to the opening 341, and a flange 412 extending in an outward direction from a circumference of an upper portion of the main body 411.

In one embodiment, the interface body 410 may further include at least one insertion projection 413 formed to protrude in a downward direction from the flange 412.

In one embodiment, the first PCB 340 may further include at least one projection insertion groove 343 formed at a position corresponding to the at least one insertion projection 413.

In one embodiment, the interface body 410 may further include a plurality of terminal connectors 414 for connecting the plurality of second connecting terminals 420.

In one embodiment, each terminal connector 414 of the plurality of terminal connectors 414 may include a first groove 4141 formed by recessing an upper surface of the main body 411 so that the first portion 421 of the respective second connecting terminal 420 is inserted and disposed in the first groove, and a through-hole 4142 formed to penetrate the flange 412 at a position communicating with the first groove 4141 so that the second portion 422 of the respective second connecting terminal 420 is disposed by passing through the through-hole 4142 in the flange 412.

In one embodiment, each terminal connector 414 of the plurality of terminal connectors 414 may further include an expansion groove 4144 formed by extending an end portion of the first groove 4141 to obtain a free space between the other end portion of the first portion 421 and the first groove 4141, in a state where the first portion 421 is inserted into the first groove 4141.

In one embodiment, the plurality of first connecting terminals 342 and the plurality of second connecting terminals 420 may be formed in a same number.

In one embodiment, the plurality of first connecting terminals 342 may be formed through plating on an inner wall of the opening 341.

According to an embodiment, an electronic device includes a first printed circuit board (PCB) 540 including an opening 541, and a plurality of first connecting terminals 542 disposed to be spaced apart from each other along a circumference of the opening 541, a first camera module 550*a* including a second PCB 553*a*, a second camera module 550*b* including a third PCB 553*b*, and a connecting interface 600 including an interface body 610 connected to a lower end of the first camera module 550*a* and a lower end of the second camera module 550*b*, and a plurality of second connecting terminals 620 formed of an elastic material and disposed to be spaced apart from each other along a circumference of the interface body 610 to be electrically connected to the second PCB 553*a* or the third PCB 553*b*, wherein the connecting interface 600 is inserted into the opening 541 so that each first connecting terminal 542 of the plurality of first connecting terminals 542 is electrically connected to one respective second connecting terminal 620 of the plurality of second connecting terminals 620, and a relative position of the connecting interface 600 with respect to the opening 541 is fixed by an elastic force of the plurality of second connecting terminal 620.

In one embodiment, each second connecting terminal 620 of the plurality of second connecting terminals 620 may include a first portion 421 disposed on an upper side of the interface body 610 in a horizontal direction, a second portion 422 bent and extending from one end portion of the first portion 421 to be disposed in a lateral direction of the interface body 610, and a hook portion 423 formed at one end portion of the second portion 422, wherein a bending angle A1 between the first portion 421 and the second portion 422 in an initial state may be 90 degrees or more, and wherein the bending angle between the first portion 421 and the second portion 422 may be elastically changeable by the elastic force of the respective second connecting terminal 620.

In one embodiment, in a process in which the connecting interface 600 is inserted into the opening 541, the second portion 422 may be elastically bent with respect to the first portion 421 in a direction in which the bending angle A1 becomes smaller than the initial state due to contact between the hook portion 423 and the first connecting terminal 542, and when the connecting interface 600 is completely inserted into the opening 541, the respective second connecting terminal 620 may generate its own elastic force in a direction in which the second portion 422 is pressed toward the first connecting terminal 542.

In one embodiment, the interface body 610 may include a main body 611 formed in a size corresponding to the opening 541, a flange 612 extending in an outward direction from a circumference of an upper portion of the main body 611, and at least one insertion projection 613 formed to protrude in a downward direction from the flange 612.

According to an embodiment, an electronic device 301 includes a first PCB 340 including an opening 341, and a plurality of first connecting terminals 342 disposed to be spaced apart from each other along a circumference of the opening 341, a camera module 350 including a second PCB 353, and a connecting interface 400 including an interface body 410 connected to a lower end of the camera module 350, and a plurality of second connecting terminals 420 formed of an elastic material and disposed to be spaced apart from each other along a circumference of the interface body 410 to be electrically connected to the second PCB 353, wherein the connecting interface 400 is inserted into the opening 341 so that each first connecting terminal 342 of the plurality of first connecting terminals 342 is electrically connected to one respective second connecting terminal 420 of the plurality of second connecting terminals 420, a relative position of the connecting interface 400 with respect to the opening 341 is fixed by an elastic force of the plurality of second connecting terminal 420, each second connecting terminal 420 of the plurality of second connecting terminals 420 includes a first portion 421 disposed on an upper side of the interface body 410 in a horizontal direction, a second portion 422 bent and extending from one end portion of the first portion 421 to be disposed in a lateral direction of the interface body 410, and a hook portion 423 formed at one end portion of the second portion 422, wherein a bending angle A1 between the first portion 421 and the second portion 422 in an initial state is 90 degrees or more, wherein the bending angle A1 between the first portion 421 and the second portion 422 is elastically changeable by the elastic force of the second connecting terminal 420, and wherein the interface body 410 includes a main body 411 formed in a size corresponding to the opening 341, a flange 412 extending in an outward direction from a circumference of an upper portion of the main body 411, and at least one insertion projection 413 formed to protrude in a downward direction from the flange 412.

According to an embodiment, an electronic device includes a first printed circuit board (PCB) comprising an opening, and a plurality of first connecting terminals disposed to be spaced apart from each other along a circumference of the opening, a camera module comprising a second PCB; and a connecting interface inserted in the opening, the connecting interface comprising an interface body connected to a lower end of the camera module, and a plurality of second connecting terminals formed of an elastic material and disposed to be spaced apart from each other along a circumference of the interface body to be electrically connected to the second PCB, wherein the interface body comprises a main body and a recessed portion, the recessed portion recessed from an upper surface of the main body, wherein the lower end of the camera module is disposed on the recessed portion, and wherein each second connecting terminal of the plurality of second connecting terminals comprises an extension that extends along a sidewall and a top surface of the recessed portion of the interface body, the extension extending under the lower end of the camera module.

In one embodiment, an electronic device further includes a solder member on a surface of the extension, the solder member directly between the extension and the lower end of the camera module.

What is claimed is:

1. An electronic device comprising:

a first printed circuit board (PCB) comprising an opening, and a plurality of first connecting terminals disposed to be spaced apart from each other along a circumference of the opening;

a camera module comprising one or more lenses, an image sensor, and a second PCB on which the image sensor is disposed; and a connecting interface comprising an interface body connected to a lower end of the camera module, and a plurality of second connecting terminals formed of an elastic material, disposed to be spaced apart from each other along a circumference of the interface body, and electrically connected to the second PCB, wherein the connecting interface is inserted into the opening so that each first connecting terminal of the plurality of first connecting terminals is electrically connected to one respective second connecting terminal of the plurality of second connecting terminals, and so that respective hook portions of the second connecting terminals passes through the opening, whereby a position of the connecting interface is fixed with respect to the first PCB, and a relative position of the connecting interface with respect to the opening is fixed by an elastic force of the plurality of second connecting terminals.

2. The electronic device of claim 1, wherein each second connecting terminal of the plurality of second connecting terminals comprises:

a first portion disposed on an upper side of the interface body in a horizontal direction; and a second portion bent and extending from one end of the first portion to be disposed in a lateral direction of the interface body.

3. The electronic device of claim 2, wherein:

a bending angle between the first portion and the second portion in an initial state is 90 degrees or more, and the bending angle between the first portion and the second portion is elastically changeable by an elastic force of the respective second connecting terminal.

4. The electronic device of claim 3, wherein the hook portion of each second connecting terminal of the plurality of second connecting terminals is formed at one end of the second portion.

5. The electronic device of claim 4, wherein, in a process in which the connecting interface is inserted into the opening, the second portion is elastically bent with respect to the first portion in a direction in which the bending angle becomes smaller than the initial state due to contact between the hook portion and the respective first connecting terminal.

6. The electronic device of claim 5, wherein, when the connecting interface is completely inserted into the opening, each second connecting terminal of the plurality of second connecting terminals generates its own elastic force in a direction in which the respective second portion is pressed toward the first connecting terminal.

7. The electronic device of claim 2, wherein the interface body comprises:

a main body formed in a size corresponding to the opening; and a flange extending in an outward direction from a circumference of an upper portion of the main body.

8. The electronic device of claim 7, wherein the interface body comprises at least one insertion projection formed to protrude in a downward direction from the flange.

9. The electronic device of claim 8, wherein the first PCB further comprises at least one projection insertion groove formed at a position corresponding to the at least one insertion projection.

10. The electronic device of claim 7, wherein the interface body further comprises a plurality of terminal connectors for connecting the plurality of second connecting terminals.

11. The electronic device of claim 10, wherein each terminal connector of the plurality of terminal connectors comprises:

a first groove formed by recessing an upper surface of the main body so that the first portion of the respective second connecting terminal is inserted and disposed in the first groove; and a through-hole formed to penetrate through the flange at a position communicating with the first groove so that the second portion of the respective second connecting terminal is disposed by passing through the through-hole in the flange.

12. The electronic device of claim 11, wherein each terminal connector of the plurality of terminal connectors comprises an expansion groove formed by extending an end of the first groove to obtain a free space between the other end of the first portion and the first groove, when the first portion is inserted into the first groove.

13. The electronic device of claim 1, wherein the plurality of first connecting terminals and the plurality of second connecting terminals are formed in a same number.

14. The electronic device of claim 1, wherein the plurality of first connecting terminals are formed by plating on an inner wall of the opening.

15. An electronic device comprising:

a first printed circuit board (PCB) comprising an opening, and a plurality of first connecting terminals disposed to be spaced apart from each other along a circumference of the opening;

a first camera module comprising one or more first lenses, a first image sensor, and a second PCB on which the first image sensor is disposed;

a second camera module comprising one or more second lenses, a second image sensor, and a third PCB on which the second image sensor is disposed; and a connecting interface comprising an interface body connected to a lower end of the first camera module and a lower end of the second camera module, and a plurality of second connecting terminals formed of an elastic material, disposed to be spaced apart from each other along a circumference of the interface body, and electrically connected to the second PCB or the third PCB, wherein the connecting interface is inserted into the opening so that each first connecting terminal of the plurality of first connecting terminals is electrically connected to one respective second connecting terminal of the plurality of second connecting terminals, and so that respective hook portions of the second connecting terminals passes through the opening, whereby a position of the connecting interface is fixed with respect to the first PCB, and a relative position of the connecting interface with respect to the opening is fixed by an elastic force of the plurality of second connecting terminals.

16. The electronic device of claim 15, wherein each second connecting terminal of the plurality of second connecting terminals comprises:

a first portion disposed on an upper side of the interface body in a horizontal direction;

a second portion bent and extending from one end of the first portion to be disposed in a lateral direction of the interface body; and a hook portion formed at one end of the second portion, wherein a bending angle between the first portion and the second portion in an initial state is 90 degrees or more, and wherein the bending angle between the first portion and the second portion is elastically changeable by an elastic force of the respective second connecting terminal.

17. The electronic device of claim 16, wherein, in a process in which the connecting interface is inserted into the opening, the second portion is elastically bent with respect to the first portion in a direction in which the bending angle becomes smaller than the initial state due to contact between the hook portion and the first connecting terminal, and when the connecting interface is completely inserted into the opening, the respective second connecting terminal generates its own elastic force in a direction in which the second portion is pressed toward the first connecting terminal.

18. The electronic device of claim 16, wherein the interface body comprises:

a main body formed in a size corresponding to the opening;

a flange extending in an outward direction from a circumference of an upper portion of the main body; and at least one insertion projection formed to protrude in a downward direction from the flange.

19. An electronic device comprising:

a first printed circuit board (PCB) comprising an opening, and a plurality of first connecting terminals disposed to be spaced apart from each other along a circumference of the opening;

a camera module comprising one or more lenses, an image sensor, and a second PCB on which the image sensor is disposed; and a connecting interface comprising an interface body connected to a lower end of the camera module, and a plurality of second connecting terminals formed of an elastic material, disposed to be spaced apart from each other along a circumference of the interface body, and electrically connected to the second PCB, wherein the connecting interface is inserted into the opening so that each first connecting terminal of the plurality of first connecting terminals is electrically connected to one respective second connecting terminal of the plurality of second connecting terminals, a relative position of the connecting interface with respect to the opening is fixed by an elastic force of the plurality of second connecting terminals, wherein each second connecting terminal of the plurality of second connecting terminals comprises:

a first portion disposed on an upper side of the interface body in a horizontal direction;

a second portion bent and extending from one end of the first portion to be disposed in a lateral direction of the interface body; and a hook portion formed at one end of the second portion and, configured such that respective hook portions of the second connecting terminals passes through the opening, whereby a position of the connecting interface is fixed with respect to the first PCB, wherein a bending angle between the first portion and the second portion in an initial state is 90 degrees or more, and wherein the bending angle between the first portion and the second portion is elastically changeable by the elastic force of the second connecting terminal, and wherein the interface body comprises:

a main body formed in a size corresponding to the opening;

a flange extending in an outward direction from a circumference of an upper portion of the main body; and at least one insertion projection formed to protrude in a downward direction from the flange.

* * * * *